United States Patent
Beckman et al.

(10) Patent No.: US 10,284,600 B2
(45) Date of Patent: *May 7, 2019

(54) SYSTEM AND METHOD FOR UPDATING DOWNLOADED APPLICATIONS USING MANAGED CONTAINER

(71) Applicant: OPEN TEXT SA ULC, Halifax (CA)

(72) Inventors: Gregory Beckman, Baden (CA); Robert Laird, Waterloo (CA); Alain Gagne, Waterloo (CA)

(73) Assignee: Open Text SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/595,481

(22) Filed: May 15, 2017

(65) Prior Publication Data

US 2017/0249448 A1    Aug. 31, 2017

Related U.S. Application Data

(63) Continuation of application No. 14/491,451, filed on Sep. 19, 2014, now Pat. No. 9,674,225.

(Continued)

(51) Int. Cl.
*G06F 21/62* (2013.01)
*H04L 29/06* (2006.01)
(Continued)

(52) U.S. Cl.
CPC .......... *H04L 63/20* (2013.01); *G06F 3/04817* (2013.01); *G06F 8/65* (2013.01);
(Continued)

(58) Field of Classification Search
CPC .. G06F 21/10; G06F 21/6218; G06F 3/04817; G06F 8/65; G06F 21/16;
(Continued)

(56) References Cited

U.S. PATENT DOCUMENTS 5,517,549 A    5/1996 Lee
5,727,155 A    3/1998 Dawson
(Continued)

FOREIGN PATENT DOCUMENTS

| EP | 2003854 A1 | 12/2008 |
|---|---|---|
| WO | WO2013023179 | 2/2013 |
| WO | WO2013151454 A1 | 10/2013 |

OTHER PUBLICATIONS

Whitmore, "A method for designing secure solutions", IBM System Journal, vol. 40, No. 3, 2001.*

(Continued)

*Primary Examiner* — Luu T Pham
*Assistant Examiner* — Walter J Malinowski
(74) *Attorney, Agent, or Firm* — Sprinkle IP Law Group

(57) ABSTRACT

A managed container may be configured to manage enterprise applications, manage enterprise information stored on a device, manage a protected storage area used by the managed container to store and reference the enterprise applications during execution, and manage a database storing enterprise rules related to management of the enterprise applications and the enterprise information. The managed container may communicate with an application gateway server to control download and update of the enterprise applications, the enterprise information, and the enterprise rules. The application gateway server may be coupled to a backend enterprise application. At least one of the enterprise applications may be configured to execute in conjunction with the backend enterprise application according to at least one of the enterprise rules, and is configured to, according to another one of the enterprise rules, manage the enterprise information associated with the backend enterprise application.

20 Claims, 8 Drawing Sheets

Related U.S. Application Data

(60) Provisional application No. 61/880,502, filed on Sep. 20, 2013.

(51) Int. Cl.
  *G06F 3/0481* (2013.01)
  *G06F 8/65* (2018.01)
  *H04L 29/08* (2006.01)
  *G06F 21/10* (2013.01)
  *G06F 21/16* (2013.01)

(52) U.S. Cl.
  CPC .............. *G06F 21/10* (2013.01); *G06F 21/16* (2013.01); *G06F 21/6218* (2013.01); *H04L 29/06* (2013.01); *H04L 63/02* (2013.01); *H04L 63/0428* (2013.01); *H04L 63/10* (2013.01); *H04L 63/105* (2013.01); *H04L 67/02* (2013.01); *H04L 67/10* (2013.01); *H04L 67/28* (2013.01); *H04L 67/2823* (2013.01); *H04L 67/2857* (2013.01); *H04L 67/42* (2013.01); *G06F 2221/2143* (2013.01)

(58) Field of Classification Search
  CPC . G06F 2221/2143; H04L 29/06; H04L 63/10; H04L 63/20; H04L 63/02; H04L 63/0428; H04L 63/105; H04L 67/02; H04L 67/10; H04L 67/28; H04L 67/2823; H04L 67/2857; H04L 67/42; H05K 999/99; H04W 12/08
  USPC .......................... 726/12, 1, 3; 709/203, 217
  See application file for complete search history.

(56) References Cited

U.S. PATENT DOCUMENTS

| | | | |
|---|---|---|---|
| 5,920,861 A | 7/1999 | Hall | |
| 5,995,756 A | 11/1999 | Herrmann | |
| 6,088,747 A * | 7/2000 | Cotugno | G06F 13/102 707/999.101 |
| 6,226,788 B1 | 5/2001 | Schoening | |
| 6,286,039 B1 | 9/2001 | Van Horne et al. | |
| 6,289,462 B1 | 9/2001 | McNabb et al. | |
| 6,438,695 B1 | 8/2002 | Maufer | |
| 6,553,375 B1 * | 4/2003 | Huang | G06F 8/61 |
| 6,886,017 B1 | 4/2005 | Jackson | |
| 7,146,617 B2 | 12/2006 | Mukundan et al. | |
| 7,197,041 B1 | 3/2007 | Tyebji | |
| 7,249,369 B2 | 7/2007 | Knouse et al. | |
| 7,356,679 B1 * | 4/2008 | Le | G06F 17/30067 707/E17.01 |
| 7,464,367 B2 | 12/2008 | Wain | |
| 7,464,386 B2 | 12/2008 | Millington | |
| 7,519,470 B2 | 4/2009 | Brasche et al. | |
| 7,543,118 B1 | 6/2009 | Chen et al. | |
| 7,720,975 B2 | 5/2010 | Erickson | |
| 7,769,747 B2 * | 8/2010 | Berg | G06F 9/4493 707/716 |
| 7,818,410 B1 * | 10/2010 | Barnes | G06F 9/4856 709/223 |
| 7,890,591 B2 | 2/2011 | Agrawal et al. | |
| 8,079,059 B1 | 12/2011 | Lee | |
| 8,214,747 B1 | 7/2012 | Yankovich | |
| 8,239,918 B1 | 8/2012 | Cohen | |
| 8,312,356 B1 | 11/2012 | Cousins | |
| 8,356,999 B2 | 1/2013 | Imai | |
| 8,407,265 B1 * | 3/2013 | Scheer | G06F 17/30138 707/823 |
| 8,458,232 B1 | 6/2013 | Spertus et al. | |
| 8,490,165 B2 | 7/2013 | Wray | |
| 8,522,130 B1 | 8/2013 | Gilead et al. | |
| 8,613,070 B1 | 12/2013 | Borzycki et al. | |
| 8,650,303 B1 | 2/2014 | Lang et al. | |
| 8,677,132 B1 | 3/2014 | Liao et al. | |
| 8,682,701 B1 | 3/2014 | Knauth et al. | |
| 8,682,901 B1 | 3/2014 | Cao et al. | |
| 8,717,166 B2 | 5/2014 | Diem | |
| 8,775,573 B2 | 7/2014 | Ebling et al. | |
| 8,805,956 B1 | 8/2014 | Yang et al. | |
| 8,832,681 B1 * | 9/2014 | Cantrell | G06F 8/61 717/172 |
| 8,849,978 B1 | 9/2014 | Batson et al. | |
| 8,938,781 B1 | 1/2015 | Bobel | |
| 9,069,638 B2 * | 6/2015 | Saldhana | G06F 8/65 |
| 9,092,290 B1 | 7/2015 | Bono et al. | |
| 9,098,857 B1 * | 8/2015 | Brown | G06Q 30/02 |
| 9,130,921 B2 | 9/2015 | Boubez | |
| 9,131,381 B1 | 9/2015 | Sobel | |
| 9,143,530 B2 * | 9/2015 | Qureshi | G06F 21/10 |
| 9,189,771 B2 * | 11/2015 | Watanabe | G06Q 10/10 |
| 9,201,678 B2 * | 12/2015 | Bacher | G06F 9/45558 |
| 9,270,674 B2 | 2/2016 | Lang et al. | |
| 9,286,471 B2 | 3/2016 | Qureshi et al. | |
| 9,304,745 B2 | 4/2016 | Nair | |
| 9,525,601 B2 | 12/2016 | Jang | |
| 9,674,225 B2 | 6/2017 | Beckman et al. | |
| 9,979,751 B2 | 5/2018 | Beckman et al. | |
| 10,116,697 B2 | 10/2018 | Beckman et al. | |
| 10,171,501 B2 | 1/2019 | Beckman et al. | |
| 2001/0051515 A1 | 12/2001 | Rygaard | |
| 2002/0116698 A1 | 8/2002 | Lurie et al. | |
| 2002/0147611 A1 | 10/2002 | Greene | |
| 2002/0156928 A1 | 10/2002 | Goodman | |
| 2002/0188842 A1 | 12/2002 | Willeby | |
| 2003/0023657 A1 | 1/2003 | Fischer | |
| 2003/0054810 A1 | 3/2003 | Chen | |
| 2003/0069923 A1 | 4/2003 | Peart | |
| 2003/0110272 A1 | 6/2003 | Du Castel | |
| 2003/0110443 A1 | 6/2003 | Yankovich et al. | |
| 2003/0149653 A1 | 8/2003 | Penney | |
| 2003/0191800 A1 | 10/2003 | Challenger et al. | |
| 2004/0039720 A1 | 2/2004 | Hodges | |
| 2004/0122907 A1 | 6/2004 | Chou | |
| 2004/0177359 A1 | 9/2004 | Bauch et al. | |
| 2004/0194060 A1 | 9/2004 | Ousterhout | |
| 2004/0199469 A1 | 10/2004 | Barillova et al. | |
| 2004/0205748 A1 | 10/2004 | Iyer | |
| 2004/0215700 A1 | 10/2004 | Shenfield et al. | |
| 2005/0027584 A1 | 2/2005 | Fusari | |
| 2005/0039034 A1 | 2/2005 | Doyle et al. | |
| 2005/0050071 A1 | 3/2005 | Debrunner | |
| 2005/0078944 A1 | 4/2005 | Risan et al. | |
| 2005/0102329 A1 | 5/2005 | Jiang | |
| 2005/0138618 A1 | 6/2005 | Gebhart | |
| 2005/0182958 A1 | 8/2005 | Pham et al. | |
| 2005/0193139 A1 | 9/2005 | Vinson | |
| 2005/0198100 A1 | 9/2005 | Goring et al. | |
| 2005/0240558 A1 | 10/2005 | Gil et al. | |
| 2005/0240616 A1 | 10/2005 | Alcorn | |
| 2005/0256834 A1 | 11/2005 | Millington | |
| 2006/0015562 A1 | 1/2006 | Kilian-Kehr | |
| 2006/0030333 A1 | 2/2006 | Ward et al. | |
| 2006/0037030 A1 * | 2/2006 | Kovachka-Dimitrova | G06F 8/61 719/328 |
| 2006/0047806 A1 * | 3/2006 | Bannach | H04L 43/00 709/224 |
| 2006/0075472 A1 | 4/2006 | Sanda et al. | |
| 2006/0085648 A1 | 4/2006 | Cheston | |
| 2006/0122987 A1 * | 6/2006 | Angelo | G06F 17/3089 |
| 2006/0138224 A1 | 6/2006 | Azami et al. | |
| 2006/0143133 A1 | 6/2006 | Medvinsky | |
| 2006/0230402 A1 | 10/2006 | Newport et al. | |
| 2006/0234731 A1 | 10/2006 | Taylor et al. | |
| 2006/0235973 A1 | 10/2006 | McBride et al. | |
| 2006/0248069 A1 | 11/2006 | Qing et al. | |
| 2006/0248590 A1 | 11/2006 | Johnson | |
| 2006/0277248 A1 | 12/2006 | Baxter et al. | |
| 2006/0277590 A1 | 12/2006 | Limont et al. | |
| 2007/0011292 A1 | 1/2007 | Fritsch et al. | |
| 2007/0022475 A1 | 1/2007 | Rossi et al. | |
| 2007/0038714 A1 | 2/2007 | Sell | |

(56) References Cited

U.S. PATENT DOCUMENTS

| | | |
|---|---|---|
| 2007/0061373 A1 | 3/2007 | Kilday |
| 2007/0061488 A1 | 3/2007 | Alagappan et al. |
| 2007/0091848 A1 | 4/2007 | Karia et al. |
| 2007/0120736 A1 | 5/2007 | MacKenzie et al. |
| 2007/0165615 A1 | 7/2007 | Shin et al. |
| 2007/0180477 A1 | 8/2007 | Hutcheson |
| 2007/0243880 A1 | 10/2007 | Gits |
| 2007/0250614 A1 | 10/2007 | Szabo |
| 2007/0250839 A1 | 10/2007 | Van Der Sanden |
| 2008/0010372 A1 | 1/2008 | Khedouri et al. |
| 2008/0014929 A1 | 1/2008 | Padmanabhuni et al. |
| 2008/0046557 A1 | 2/2008 | Cheng |
| 2008/0071820 A1 | 3/2008 | Mori et al. |
| 2008/0098237 A1 | 4/2008 | Dung et al. |
| 2008/0172414 A1 | 7/2008 | Tien |
| 2008/0177598 A1 | 7/2008 | Davie |
| 2008/0215744 A1 | 9/2008 | Shenfield |
| 2008/0240142 A1 | 10/2008 | Belgaied |
| 2008/0270977 A1 | 10/2008 | Nucci |
| 2008/0282205 A1 | 11/2008 | Dykstra-Erickson et al. |
| 2008/0311886 A1 | 12/2008 | Smith |
| 2009/0003600 A1* | 1/2009 | Chen .............. H04N 7/1675 380/217 |
| 2009/0006434 A1* | 1/2009 | Fowler .............. G06Q 30/02 |
| 2009/0007218 A1 | 1/2009 | Hubbard |
| 2009/0138877 A1 | 5/2009 | Fitzgerald et al. |
| 2009/0157882 A1* | 6/2009 | Kashyap .............. H04L 69/16 709/227 |
| 2009/0228821 A1 | 9/2009 | Tapper |
| 2009/0282399 A1* | 11/2009 | Kamrowski .............. G06F 8/68 717/174 |
| 2009/0282403 A1* | 11/2009 | Poole .............. G06F 8/61 717/178 |
| 2009/0327262 A1 | 12/2009 | Grack |
| 2010/0017461 A1 | 1/2010 | Kokkevis et al. |
| 2010/0043017 A1 | 2/2010 | Paul et al. |
| 2010/0050167 A1 | 2/2010 | Bibr et al. |
| 2010/0122274 A1 | 5/2010 | Gillies et al. |
| 2010/0144309 A1 | 6/2010 | Nalley |
| 2010/0198651 A1 | 8/2010 | Johnson |
| 2010/0203960 A1 | 8/2010 | Wilson et al. |
| 2010/0210240 A1 | 8/2010 | Mahaffey et al. |
| 2010/0235820 A1* | 9/2010 | Khouzam .............. H04N 21/4143 717/148 |
| 2010/0269096 A1* | 10/2010 | Araya .............. G06F 8/71 717/113 |
| 2010/0312817 A1* | 12/2010 | Steakley .............. G06F 8/61 709/202 |
| 2010/0325717 A1 | 12/2010 | Goel |
| 2011/0035742 A1 | 2/2011 | Shenfield |
| 2011/0126192 A1 | 5/2011 | Frost |
| 2011/0126193 A1 | 5/2011 | Mullin |
| 2011/0141276 A1 | 6/2011 | Borghei |
| 2011/0145930 A1 | 6/2011 | Gnech et al. |
| 2011/0179126 A1 | 7/2011 | Wetherell |
| 2011/0191822 A1 | 8/2011 | Pinsky et al. |
| 2011/0213857 A1* | 9/2011 | Philipeit .............. G06F 9/455 709/217 |
| 2011/0218965 A1 | 9/2011 | Lee |
| 2011/0258658 A1 | 10/2011 | Mobasser |
| 2011/0277027 A1 | 11/2011 | Hayton et al. |
| 2011/0314389 A1 | 12/2011 | Meredith et al. |
| 2012/0005041 A1 | 1/2012 | Mehta |
| 2012/0089668 A1 | 4/2012 | Berg et al. |
| 2012/0094685 A1 | 4/2012 | Marsico |
| 2012/0110112 A1 | 5/2012 | Luna et al. |
| 2012/0117611 A1 | 5/2012 | Wookey |
| 2012/0129503 A1 | 5/2012 | Lindeman et al. |
| 2012/0129572 A1* | 5/2012 | Johnstone .............. G06F 8/67 455/552.1 |
| 2012/0143728 A1 | 6/2012 | Bhogal et al. |
| 2012/0185398 A1 | 7/2012 | Weis et al. |
| 2012/0185863 A1 | 7/2012 | Krstic et al. |
| 2012/0185912 A1 | 7/2012 | Lee |
| 2012/0212323 A1 | 8/2012 | Skaaksrud et al. |
| 2012/0220263 A1 | 8/2012 | Smith |
| 2012/0226767 A1 | 9/2012 | Luna et al. |
| 2012/0278117 A1* | 11/2012 | Nguyen .............. G06Q 10/06 705/7.15 |
| 2012/0290686 A1 | 11/2012 | Anchan et al. |
| 2012/0304310 A1 | 11/2012 | Blaisdell |
| 2012/0311527 A1 | 12/2012 | Lee |
| 2012/0314864 A1 | 12/2012 | Remprased |
| 2012/0317370 A1 | 12/2012 | Luna |
| 2012/0331527 A1 | 12/2012 | Walters et al. |
| 2013/0007245 A1 | 1/2013 | Malik et al. |
| 2013/0014006 A1* | 1/2013 | Abellera .............. G06F 3/04817 715/234 |
| 2013/0054702 A1 | 2/2013 | Belchee et al. |
| 2013/0061289 A1 | 3/2013 | McFarland et al. |
| 2013/0061307 A1 | 3/2013 | Livne |
| 2013/0067449 A1* | 3/2013 | Sannidhanam .............. G06F 8/60 717/170 |
| 2013/0080636 A1 | 3/2013 | Friedman et al. |
| 2013/0081033 A1 | 3/2013 | Levien |
| 2013/0084846 A1 | 4/2013 | Walker et al. |
| 2013/0091557 A1 | 4/2013 | Gurrapu |
| 2013/0110672 A1* | 5/2013 | Yang .............. G06Q 20/353 705/26.8 |
| 2013/0111460 A1 | 5/2013 | Mohamed et al. |
| 2013/0111598 A1 | 5/2013 | Marcovecchio et al. |
| 2013/0117414 A1 | 5/2013 | Dash |
| 2013/0117563 A1 | 5/2013 | Grabelkovsly |
| 2013/0124674 A1 | 5/2013 | Matsumoto |
| 2013/0132422 A1 | 5/2013 | Rogish et al. |
| 2013/0132854 A1* | 5/2013 | Raleigh .............. G06F 3/0482 715/738 |
| 2013/0159993 A1 | 6/2013 | Misovski |
| 2013/0159996 A1 | 6/2013 | Lin |
| 2013/0174154 A1* | 7/2013 | Poore .............. G06F 8/00 718/1 |
| 2013/0183951 A1 | 7/2013 | Chien |
| 2013/0198764 A1 | 8/2013 | Kacin et al. |
| 2013/0219006 A1 | 8/2013 | Kuo |
| 2013/0219176 A1 | 8/2013 | Akella et al. |
| 2013/0225282 A1 | 8/2013 | Williams |
| 2013/0227558 A1 | 8/2013 | Du et al. |
| 2013/0231093 A1 | 9/2013 | Toy et al. |
| 2013/0238808 A1* | 9/2013 | Hallem .............. H04L 63/0281 709/227 |
| 2013/0239192 A1 | 9/2013 | Linga |
| 2013/0247222 A1 | 9/2013 | Maksim et al. |
| 2013/0252585 A1 | 9/2013 | Moshir et al. |
| 2013/0263212 A1 | 10/2013 | Faltyn et al. |
| 2013/0268470 A1 | 10/2013 | Yablokov |
| 2013/0275404 A1 | 10/2013 | Osetinsky |
| 2013/0283262 A1 | 10/2013 | Rehtijarvi |
| 2013/0290718 A1 | 10/2013 | Zhuang et al. |
| 2013/0290880 A1 | 10/2013 | Wu et al. |
| 2013/0291086 A1 | 10/2013 | Pontillo et al. |
| 2013/0297789 A1 | 11/2013 | Park et al. |
| 2013/0298183 A1 | 11/2013 | McGrath et al. |
| 2013/0298185 A1 | 11/2013 | Koneru |
| 2013/0298193 A1 | 11/2013 | McGrath et al. |
| 2013/0310159 A1 | 11/2013 | Froy et al. |
| 2013/0347064 A1 | 12/2013 | Aissi |
| 2014/0007214 A1 | 1/2014 | Qureshi |
| 2014/0007215 A1* | 1/2014 | Romano .............. H04L 63/0281 726/12 |
| 2014/0007222 A1 | 1/2014 | Qureshi et al. |
| 2014/0020068 A1 | 1/2014 | Desai et al. |
| 2014/0025954 A1* | 1/2014 | Isozaki .............. H04L 63/0227 713/176 |
| 2014/0032647 A1* | 1/2014 | Nimura .............. H04W 4/001 709/203 |
| 2014/0033299 A1* | 1/2014 | McGloin .............. G06F 21/60 726/18 |
| 2014/0047556 A1 | 2/2014 | Davis |
| 2014/0059494 A1 | 2/2014 | Lee et al. |
| 2014/0059642 A1 | 2/2014 | Deasy et al. |
| 2014/0082135 A1 | 3/2014 | Jung et al. |
| 2014/0089376 A1 | 3/2014 | Caldas et al. |

(56) References Cited

U.S. PATENT DOCUMENTS

| | | |
|---|---|---|
| 2014/0095724 A1 | 4/2014 | Yoakum et al. |
| 2014/0108474 A1 | 4/2014 | David |
| 2014/0108799 A1 | 4/2014 | Wang et al. |
| 2014/0109174 A1 | 4/2014 | Barton et al. |
| 2014/0120905 A1 | 5/2014 | Kim |
| 2014/0130174 A1 | 5/2014 | Celi, Jr. |
| 2014/0149485 A1* | 5/2014 | Sharma ............... H04L 67/142 709/202 |
| 2014/0164125 A1 | 6/2014 | Taylor |
| 2014/0181894 A1 | 6/2014 | Von Bokern et al. |
| 2014/0188601 A1 | 7/2014 | Buset |
| 2014/0188804 A1 | 7/2014 | Gokhale et al. |
| 2014/0195665 A1* | 7/2014 | Jang .................... H04W 4/02 709/223 |
| 2014/0253466 A1 | 9/2014 | Brewer |
| 2014/0280276 A1 | 9/2014 | Prasanna |
| 2014/0280822 A1 | 9/2014 | Chennimalai et al. |
| 2014/0281531 A1 | 9/2014 | Phegade et al. |
| 2014/0282371 A1* | 9/2014 | Hirsch ................... G06F 8/36 717/106 |
| 2014/0282829 A1 | 9/2014 | Dabbiere |
| 2014/0330990 A1 | 11/2014 | Lang |
| 2014/0331060 A1 | 11/2014 | Hayton |
| 2014/0359081 A1 | 12/2014 | Van Deventer |
| 2014/0366014 A1 | 12/2014 | Mair |
| 2014/0366080 A1 | 12/2014 | Gupta |
| 2014/0372980 A1 | 12/2014 | Verma |
| 2015/0006482 A1 | 1/2015 | Hardy et al. |
| 2015/0026617 A1* | 1/2015 | Liang .................. G06F 9/4443 715/765 |
| 2015/0039677 A1 | 2/2015 | Kahol et al. |
| 2015/0088934 A1 | 3/2015 | Beckman et al. |
| 2015/0089224 A1 | 3/2015 | Beckman et al. |
| 2015/0089577 A1 | 3/2015 | Beckman et al. |
| 2015/0089659 A1 | 3/2015 | Beckman et al. |
| 2015/0089673 A1 | 3/2015 | Beckman et al. |
| 2015/0128105 A1 | 5/2015 | Sethi |
| 2015/0193241 A1* | 7/2015 | Hamzata ............ G06F 3/04842 719/320 |
| 2015/0244774 A1 | 8/2015 | Jang |
| 2015/0277702 A1 | 10/2015 | Hardwick et al. |
| 2015/0278513 A1 | 10/2015 | Krasin et al. |
| 2015/0288671 A1 | 10/2015 | Chan |
| 2015/0310208 A1 | 10/2015 | Prabhu |
| 2015/0326557 A1 | 11/2015 | Teramura et al. |
| 2015/0333982 A1* | 11/2015 | Kang .................. G06F 3/04817 709/224 |
| 2016/0026366 A1 | 1/2016 | Luan |
| 2016/0028688 A1 | 1/2016 | Chizhov |
| 2016/0092179 A1 | 3/2016 | Straub |
| 2016/0188621 A1* | 6/2016 | Karinta ............ G06F 17/30221 707/827 |
| 2017/0123768 A1 | 5/2017 | Liu et al. |
| 2017/0201850 A1 | 7/2017 | Raleigh et al. |
| 2017/0250853 A1 | 8/2017 | Evans |
| 2017/0316224 A1 | 11/2017 | Beckman et al. |
| 2018/0018150 A1 | 1/2018 | Liu et al. |
| 2018/0248915 A1 | 8/2018 | Beckman et al. |
| 2019/0036975 A1 | 1/2019 | Beckman et al. |

OTHER PUBLICATIONS

Recker, "A Preferable Look—APL in Window-based Environments", APL 90, ACM 990, pp. 312-321.*

Jones, Matthew B., Chad Berkley, Jivka Bojilova, and Mark Schildhauer. "Managing scientific metadata." IEEE Internet Computing 5, No. 5 (2001): 59-68. (Year: 2001).*

Molva, Refik, and Erich Rütsche. "Application access control at network level." In Proceedings of the 2nd ACM Conference on Computer and Communications Security, pp. 219-228. ACM, 1994. (Year: 1994).*

European Search Report issued for European Application No. 14185781.3, dated Jan. 29, 2015, 9 pages.

Citrix: "Citrix XenMobile Technology Overview: White Paper," Citrix White papers on line, <http://www.insight.com/content/dam/insight/en_US/pdfs/citrix/xenmobile-tech-overview.pdf>, Jul. 31, 2012, 14 pages.

"Citrix MDX Feature Brief," <http://ebookbrowsee.net/citrix-mdx-feature-brief-pdf-d506183473>, Jul. 21, 2013, 12 pages.

Examination Report issued for European Patent Application No. 14 185 781.3, dated Jan. 18, 2016, 6 pages.

Office Action issued for U.S. Appl. No. 14/534,623, dated Jan. 20, 2016, 19 pages.

Office Action issued for U.S. Appl. No. 14/491,386, dated Feb. 11, 2016, 33 pages.

Sobesto et al., "Are Computer Focused Crimes Impacted by System Configurations: An Empirical Study", 2012 IEEE 23rd International Symposium on Software Reliability Engineering, 2012, pp. 191-200.

Catching based on application deployed in mobile devices in mobile networks:, IPCCOM000209387D, Aug. 2, 2011, 4 pages.

Office Action issued for U.S. Appl. No. 14/491,451, dated Mar. 3, 2016, 34 pages.

Office Action issued for U.S. Appl. No. 14/534,623 dated Jun. 11, 2016, 31 pages.

Office Action issued for U.S. Appl. No. 14/491,386 dated Aug. 9, 2016, 36 pages.

Office Action issued for U.S. Appl. No. 14/491,451 dated Aug. 22, 2016, 34 pages.

Office Action issued for U.S. Appl. No. 14/534,623, dated Sep. 28, 2016, 44 pages.

Howatson, "The Power of EIM Applications," OpenText Engineering, Nov. 2013, 31 pages.

Office Action for U.S. Appl. No. 14/491,492, dated Nov. 24, 2015, 21 pages.

Office Action for U.S. Appl. No. 14/491,483, dated Nov. 10, 2015, 32 pages.

Go! Enterprise, "Your Enterprise Go!es Mobile", Apr. 11, 2012, 6 pages., Globoplc, San Jose, CA.

Pestana, et al., "LocON: A Location Based Services Platform to Improve Airport Safety", IEEEAC paper #1737, Version 2, 2011, pp. 1-10.

Office Action for U.S. Appl. No. 14/491,492, dated May 13, 2016, 20 pages.

Office Action for U.S. Appl. No. 14/491,483, dated Jun. 9, 2016, 28 pages.

Office Action for U.S. Appl. No. 14/491,492, dated Sep. 1, 2016, 25 pages.

Meily "Secure Mobile Productivity in a BYOD World: Box for Good Technology," retrieved from https://www.box.com/blog/secure-mobile-productivity-in-a-byod-world-box-for-good-technology/, Dec. 11, 2012, 2 pages.

Office Action for U.S. Appl. No. 14/491,483, dated Sep. 21, 2016, 33 pages.

Preiss, "User-Centered Development of a Wireless Sensor Network-Based Asset Management System for Mobile Measurement Devices", Conference: Smart SysTech 2012, Jun. 12-13, 2012, Germany, 7 pages.

Martens, "A Declarative Approach to a User-Centric Markup Language for Location-Based Services", Mobility 2009, Sep. 2-4, 2009, Nice France, 7 pages.

Notice of Allowance issued for European Patent Application No. 14185781.3, dated Jan. 24, 2017, 53 pages.

Office Action issued for U.S. Appl. No. 14/491,386, dated Jan. 30, 2017, 43 pages.

Medjahed, "Business-to-business interactions: issues and enabling technologies", The VLDB Journal, 2003, pp. 59-85.

Li, "Security Considerations for Workflow Systems", 2000, IEEE, pp. 655-668.

Oracle White Paper, "Securing SOA and Web Services with Oracle Enterprise Gateway", Apr. 2011, 22 pages.

Office Action issued for U.S. Appl. No. 14/491,492, dated Feb. 6, 2017, 31 pages.

Luo, "Risk Based Mobile Access Control (RiBMAC) Policy Framework", The 2011 Military Communications Conference—Track 3—Cyber Security and Network Operations, 2011, pp. 1448-1453.

(56) References Cited

OTHER PUBLICATIONS

Lennon, "Bring Your Own Device (BYOD) with Cloud 4 Education", SPLASH'12, Oct. 19-26, 2012, pp. 171-179.
Office Action issued for U.S. Appl. No. 14/491,483, dated Feb. 6, 2017, 37 pages.
Notice of Allowance issued for U.S. Appl. No. 14/534,623, dated Feb. 24, 2017 7 pages.
Notice of Allowance issued for U.S. Appl. No. 14/491,451, dated Feb. 28, 2017, 11 pages.
Suri, "Dynamic Service-oriented Architectures for Tactical Edge Networks", WEWST 2009, Nov. 9, 2009, Eindhoven, Netherlands, pp. 3-10.
David, "Everything You Always Wanted to Know About Synchronization but Were Afraid to Ask", SOSP'13, Nov. 3-6, 2013, Farmington, Pennsylvania, pp. 33-48.
Genbrugge, "Interval Simulation: Raising the Level of Abstraction in Architectural Simulation", IEEE, 2009, 12 pages.
Kuroda, "A Study of Autonomous Data Coherency Protocol for Mobile Devices", IEEE, 1999, pp. 250-256.
Prosser, "In-Depth: Container Fields", FileMaker Community, Apr. 3, 2014, 51 pages.
Notice of Allowance issued for U.S. Appl. No. 14/491,451, dated Apr. 25, 2017, 10 pages.
Leach et al., "The Architecture of an Integrated Local Network," IEEE Journal on Selected Areas in Communications, vol. Sac-1, No. 5, Nov. 1983 pp. 842-857.
Sherr et al., "Application Containers Without Virtual Machines," Dept. of Computer and Information Science, University of Pennsylvania, ® 2009, pp. 39-41.
Office Action issued for U.S. Appl. No. 14/491,492, dated Nov. 13, 2017, 38 pages.
Notice of Allowance for U.S. Appl. No. 14/491,483, dated Nov. 16, 2017, 12 pages.
Carter, Fred et al, Enabling Portable Application Development for New Media Networks, Oracle Corp., IEEE, 1995, pp. 63-70.
Sadtler, Carla, WebSphere Application Server V6 Technical Overview, IBM Redbooks Paper, IBM Corp., 2004, 64 pages.
IEEE Std PC37.1™/D5, Draft Standard for SCADA and Automation Systems, Electronic Network Control Systems Standards Working Group of the Substations Committee, IEEE, Sep. 2007, 143 pages.
Tanenbaum, Andrew, et al., Report on the Seventh ACM SIGOPS European Workshop, Systems Support for Worldwide Applications, Sep. 9-11, 1996, Connemar, Ireland, pp. 5-17.
Office Action issued for U.S. Appl. No. 14/491,483, dated Jun. 19, 2017, 35 pages.
"Application Note—Using Tenor Behind a Firewall/NAT," Quintum Tech Assistance Center, Eatontown, NJ, Mar. 16, 2005, 8 pages.
"FortiMail Install Guide," Version 3.0 MR2, Fortiner, Dec. 12, 2007, 108 pages.
Office Action issued for U.S. Appl. No. 14/491,386, dated Jun. 28, 2017, 43 pages.
Office Action issued for U.S. Appl. No. 14/491,492, dated Jul. 6, 2017, 31 pages.
Office Action issued for U.S. Appl. No. 15/653,017, dated Aug. 25, 2017, 12 pages.
Office Action issued for U.S. Appl. No. 14/491,386, dated Oct. 11, 2017, 58 pages.
Notice of Allowance for U.S. Appl. No. 15/653,017, dated Jan. 23, 2018, 8 pgs.
Notice of Allowance for U.S. Appl. No. 14/491,386, dated Mar. 28, 2018, 13 pgs.
Bruhn, "Comprehensive Support for Management of Enterprise Applications", IEEE, 2008, pp. 755-762.
Pierce, "Open Community Development for Science Gateways with Apache Rave", GCE'11, Nov. 8, 2011, Seattle, WA, pp. 29-35.
Notice of Allowance for U.S. Appl. No. 14/491,483, dated Mar. 29, 2018, 8 pgs.
Notice of Allowance for U.S. Appl. No. 14/491,492, dated Apr. 24, 2018, 12 pgs.
Ross, Philip E., "Top 11 technologies of the decade," IEEE Spectrum 48, No. 1, 2011, 38 pgs.
Burguera, Iker, et al., "Crowdroid behavior-based malware detection system for android," In Proceedings of the 1st ACM Workshop on Security and Privacy in Smartphones and Mobile Devices, ACM, 2011, pp. 15-26.
Notice of Allowance for U.S. Appl. No. 15/653,017, dated Apr. 24, 2018, 5 pgs.
Notice of Allowance for U.S. Appl. No. 14/491,492, dated Sep. 24, 2018, 10 pgs.
Notice of Allowance for U.S. Appl. No. 15/653,017, dated Sep. 24, 2018, 4 pgs.
Office Action for U.S. Appl. No. 15/442,302, dated Oct. 2, 2018, 10 pgs.
Zhang, Xinwen, et al., "Securing Elastic Applications on Mobile Devices for Cloud Computing," Proceedings of the first ACM Cloud Computing Security Workshop, CCSW 2009, Chicago, IL, USA, Nov. 13, 2009, 8 pgs.
Notice of Allowance for U.S. Appl. No. 14/491,483, dated May 7, 2018, 8 pgs.
Office Action for U.S. Appl. No. 15/340,695, dated Jun. 4, 2018, 19 pgs.
Office Action for U.S. Appl. No. 15/717,631, dated Jun. 8, 2018, 16 pgs.
Office Action for U.S. Appl. No. 15/960,000, dated Jun. 18, 2018, 19 pgs.
Daenen, Koen et al, "The Personal Internet," Bell Labs Technical Journal, 15, No. 1 2010, pp. 3-21.
Insley, Joseph A., et al., "Using Dynamic Accounts to Enable Access to Advanced Resources Through Science Gateways," In Proceedings of the 5th Grid Computing Environments Workshop, ACM, 2009, 6 pgs.
Notice of Allowance for U.S. Appl. No. 14/491,483, dated Sep. 4, 2018, 14 pgs.
Notice of Allowance for U.S. Appl. No. 14/491,492, dated Oct. 26, 2018, 8 pgs.
Office Action for U.S. Appl. No. 15/960,000, dated Jan. 18, 2019, 50 pgs.
Office Action for U.S. Appl. No. 15/717,631, dated Nov. 20, 2018, 19 pgs.
Office Action for U.S. Appl. No. 15/340,695, dated Nov. 26, 2018, 19 pgs.
Notice of Allowance for U.S. Appl. No. 15/653,017 , dated Mar. 8, 2019, 6 pgs.

* cited by examiner

SYSTEM AND METHOD FOR UPDATING DOWNLOADED APPLICATIONS USING MANAGED CONTAINER

CROSS REFERENCE TO RELATED APPLICATIONS

This is a continuation of, and claims a benefit of priority from U.S. patent application Ser. No. 14/491,451, filed Sep. 19, 2014, entitled "SYSTEM AND METHOD FOR UPDATING DOWNLOADED APPLICATIONS USING MANAGED CONTAINER," issued as U.S. Pat. No. 9,675,225, which is a conversion of, and claims a benefit of priority under 35 U.S.C. § 119 from U.S. Provisional Application No. 61/880,502, filed Sep. 20, 2013. This application relates to U.S. patent application Ser. No. 14/491,386, filed Sep. 19, 2014, which is a conversion of, and claims a benefit of priority from U.S. Provisional Application No. 61/880,481, filed Sep. 20, 2013; Ser. No. 14/491,492, filed Sep. 19, 2014, which is a conversion of, and claims a benefit of priority from U.S. Provisional Application No. 61/880,526, filed Sep. 20, 2013; and Ser. No. 14/491,483, filed Sep. 19, 2014, which is a conversion of, and claims a benefit of priority from U.S. Provisional Application No. 61/880,557, filed Sep. 20, 2013. All applications listed in this paragraph are hereby incorporated by reference as if set forth herein in their entireties, including all appendices attached thereto.

TECHNICAL FIELD

This disclosure relates generally to content management. More particularly, embodiments disclosed herein relate to a new application gateway architecture, system, and method for managing applications on client devices using managed containers.

BACKGROUND OF THE RELATED ART

Conventional content control software and services are designed to control what content delivered over the Internet may be viewed or blocked from viewing. Generally, access to such controlled content can be restricted at various levels. For instance, a firewall may be used to block access to certain websites or a timer may be set up at a user's computer to limit the amount of time that an application may be used. Additionally, filters such as e-mail filters and browser-based filters may be used.

However, such content control software and services are often inadequate to control content downloaded by users to their computers. This can be problematic for enterprises wanting to retain control over enterprise content downloaded—including applications—to devices that may or may not be owned by the enterprises. Embodiments disclosed herein can address this issue and more.

SUMMARY OF THE DISCLOSURE

This disclosure is directed to systems, methods and computer program products for managing application download and updating downloaded applications. One embodiment of a system may include an application gateway server computer communicatively connected to backend systems and client devices. The backend systems as well as the client devices may operate on different platforms. The application gateway server computer may have application programming interfaces and services configured for communicating with the backend systems and managed containers operating on the client devices.

In one embodiment, a client device communicatively connected to the application gateway server computer may include a managed container embodied on a non-transitory computer readable medium. In one embodiment, the managed container may be implemented as an application (program) that is native to the client device and that can be downloaded from a source on the Internet such as a website or an app store.

In one embodiment, the managed container has a managed cache for storing content received from the application gateway server computer. In one embodiment, content received from the application gateway server computer may include applications and data. Applications received from the application gateway server computer are not downloaded from a website or an app store on the Internet.

In one embodiment, the managed container is configured for providing a secure shell for any applications received from the application gateway server computer, storing the applications and data associated with the applications in the managed cache, and managing the managed cache in accordance with a set of rules. In some embodiments, the set of rules may reside at least partially on the client device, the backend systems, the application gateway server computer, or a combination thereof.

In some embodiments, a method for managing application download and updating downloaded applications may include examining, by a managed container operating on a client device, a list received from an application gateway server computer communicatively connected to the managed container. The managed container may determine that a first application on the list should be downloaded and downloads a client application package associated with the first application from the application gateway server computer. The managed container may operate to extract the client application package associated with the first application into a local file system of the managed container on the client device and display an icon for the first application within a user interface of the managed container on the client device.

The list may be prepared by the application gateway server computer when an application, a file associated therewith, or a rule is to be deployed to the client device. In some embodiments, such deployment may be due to a policy change or an update to the application. The list may be sent by the application gateway server computer in response to a request from the managed container operating on the client device or pushed out to the managed container per an instruction received by the application gateway server computer or per a predetermined schedule.

The managed container operating on the client device may store data associated with the first application in a managed cache of the managed container. The managed cache may be encrypted to prevent an operating system running on the client device from accessing content stored therein. In one embodiment, the managed cache may include a document cache for storing data and an application cache for storing applications downloaded from the application gateway server computer. The applications may be received by the application gateway server computer from application developers and stored in an application repository accessible by the application gateway server computer.

One embodiment may comprise a system having a processor and a memory and configured to implement the method. One embodiment may comprise a computer program product that comprises a non-transitory computer-readable storage medium which stores computer instructions that are executable by a processor to perform the method.

Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

Figure 1:
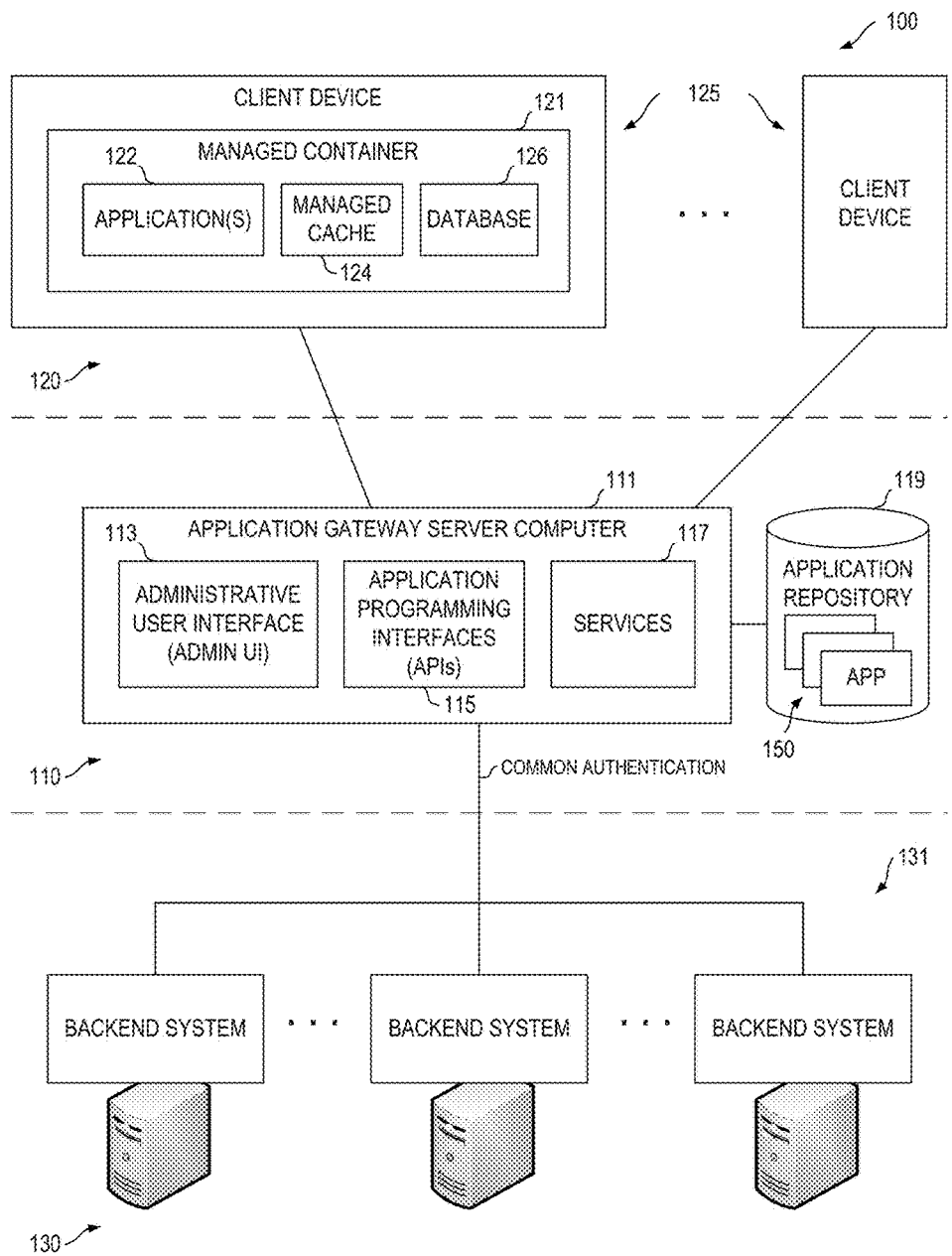
FIG. 1 depicts a diagrammatic representation of an example embodiment of an application gateway architecture implementing a multi-level content control mechanism.

The invention and the various features and advantageous details thereof are explained more fully with reference to the non-limiting embodiments that are illustrated in the accompanying drawings and detailed in the following description. Descriptions of well-known processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

Embodiments disclosed herein provide a "gateway" that controls how backend content (e.g., enterprise content owned by an enterprise) is sent out of a backend system (e.g., a content server owned by the enterprise) to or downloaded by a client device. In this disclosure, this is referred to as a first layer or level of content management or server side content management layer. Embodiments also provide a second layer or level of content management at the client side. Thus, there are controls at both the server side and the client side, providing the enterprise with the ability to enforce company policy and rules on how enterprise content is managed both in and out of backend systems and at client devices.

Embodiments of an application gateway server computer disclosed herein can, on behalf of one or more backend systems connected thereto, control content distribution to managed containers operating on client devices. Within this disclosure, a managed container refers to a special computer program for reviewing, accessing, and downloading applications via an application gateway server computer. According to embodiments, a managed container can be downloaded from a source or a network site on a private or public network such as a company's intranet or the Internet. Examples of an appropriate source may include a service or an online store (which may, in some embodiments, be referred to as an "app store").

As described herein, a managed container can control content at a client device (e.g., how a document is stored, accessed, updated, removed, etc. . . . ). For example, if a backend system (e.g., a content server, an information management system, a document repository, a business process management system, a social server, a records management (RM) system, etc.) has a policy or rule update, or a new rule on content retrieved from the backend system, the application gateway server can broadcast the update or new rule to appropriate managed containers operating on various client devices or otherwise notify the appropriate managed containers about the update or new rule (appropriate in the sense that the content, to which the update or new rule is applicable, is stored in the managed caches of such managed containers). In this way, rules can be promulgated out to appropriate client devices by the application gateway server and applied by the managed containers on those client devices to content living on the client devices without needing any help from applications associated with the content.

For example, suppose due to a policy update, access to a set of records stored in an RM system is changed to a different security level or user group. The application gateway server can determine which managed containers store a copy of the set of records (or a portion thereof) and broadcast this change to those managed containers or notify them about the change. When a managed container receives a notice (which may be sent by the application gateway server computer using a communications channel that is different from the broadcast channel, as those skilled in the art can appreciate), the managed container may initiate a connection with the application gateway server computer to retrieve the policy update. The managed containers may then apply the policy update and change the security access to the copy of the set of records (or a portion thereof) stored in their managed caches accordingly. As this example illustrates, no user is required to open up an RM application on their device in order for the policy update from the RM system at the backend to take effect on the copy of the set of records (or a portion thereof) locally stored in the managed cache on their device.

The content control mechanism described above can be implemented in various ways. FIG. 1 depicts a diagrammatic representation of an example embodiment of an application gateway architecture implementing a multi-layer (or multi-level) content control mechanism. In the example of FIG. 1, system 100 may include application gateway server computer 110 communicatively connected to backend systems 131 and one or more client devices 125. Client device 125 shown in FIG. 1 is representative of various client devices. Those skilled in the art will appreciate that FIG. 1 shows a non-limiting example of client device 125. Backend systems 131 may comprise computer program products and/or applications developed within a company and/or by third party developers/companies. Non-limiting examples of backend systems 131 may include a content server, an information management system, a document repository, a process management system, a social server, an RM system, a database management system, an enterprise resources planning system, a collaboration and management system, a customer relationship management system, a search system, an asset management system, a case management system, etc.

In some embodiments, a first layer of content management 110 ("level 110") can be realized in application gateway server computer 111 configured for controlling how backend content (e.g., applications that communicate with backend systems, documents created/used by such applications, etc.) can be sent out of the backend systems to client devices. A second layer of content management 120 ("level 120") can be realized in managed containers 121 operating on client devices 125. A third layer of content management 130 ("level 130") may include proprietary and/or third-party content management tools used by various backend systems 131.

At level 110, as shown in FIG. 1, application gateway server computer 111 may include application programming interfaces (APIs) 115 and services 117 configured for communicating with backend systems 131 and managed containers 121 operating on client devices 125. In some embodiments, applications 150 may be developed within a company and/or externally sourced and stored in application repository 119 accessible by application gateway server computer 111. Applications 150 may be associated with backend systems 131. These server-side components are explained further below.

At level 120, managed container 121 operating on client device 125 may include managed cache 124 for storing various applications 122 downloaded/pulled or received/pushed from application gateway server computer 111. All the data, documents, and files associated with applications 122 may be encrypted and stored in managed cache 124. To this end, managed cache 124 can be considered a local application repository that can provide client device 125 with offline access to cached applications 122. In some embodiments, database 126 may be used by managed container 121 to keep track of content stored in managed cache 124. Managed container 121 can be installed and run on client device 125 separate and independent of any applications that it manages. These client-side components are explained further below.

In some embodiments, managed cache 124 may store the user interface components of applications 122. However, as described below with reference to FIG. 5, not all components of applications 122 are stored in managed cache 124. In some embodiments, when an application is called (i.e., invoked by a user using client device 125 on which the application is installed), managed container 124 may obtain any data, document(s), and/or file(s) that the application needs from a backend system through application gateway server computer 111. This has the benefits of reducing the storage requirement of having applications 122 on client device 125, expediting the network transmission of applications 122, and keeping applications 122 always up-to-date.

In some embodiments, the content of managed cache 124 is managed in accordance with a set of rules. The set of rules may include rules residing at one of more backend systems 131, rules residing at application gateway server computer 111, rules residing at client device 125, or a combination thereof. In some embodiments, the set of rules may include at least one of: a data storage rule for controlling storage of the data associated with applications 122 received from application gateway server computer 111, a data policy rule for controlling access to the data associated with applications 122 received from application gateway server computer 111, an application rule for controlling at least one of applications 122 received from application gateway server computer 111, or an update rule for controlling update of the data associated with applications 122 received from application gateway server computer 111.

In some embodiments, the set of rules may be stored on client device 125. Managed container 121 may use the stored set of rules to control and/or protect the data associated with applications 122 received from application gateway server computer 111. For example, in some embodiments, when an update to one of the rules is propagated from backend system 131 to managed container 121 via application gateway server computer 111, managed container 121 may execute, based on the updated rule, an update to the data associated with applications 122 received from application gateway server computer 111. As another example, in some embodiments, managed container 121 may use the stored application rule to control application(s) 122 received from application gateway server computer 111.

In some embodiments, at least one of the set of rules may determine encryption parameters for encrypting the content of managed cache 124. Managed container 121 may encrypt the content of managed cache 124 based on the encryption parameters. In some embodiments, the encryption parameters may be shared between managed container 121 and one or more backend systems 131, via application gateway server computer 111, to enable shared secure access to the data between and among applications 122 received from application gateway server computer 111 and one or more backend systems 131. Regardless of network connectivity of client device 125, applications 122 and the associated data stored in managed cache 124 are under control of managed container 121. In this way, unauthorized access to the data stored in managed cache 124 can be limited or prevented. Unauthorized access may include access by an operating system running on client device 125 and/or access by non-managed applications executing on client device 125 such as those downloaded onto client device 125 without going through application gateway server computer 111.

In some embodiments, users (e.g., employees of a company operating or using an application gateway server computer) do not need to or are not allowed to download (e.g., from an online app store or a website on the Internet) any application into a managed container (although they may still download and install applications on their devices as usual and such applications are outside the scope of this disclosure). Rather, an administrator may, via administrative user interface 113 ("admin UI") load into managed containers on client devices associated with these users with select applications and/or services available on application gateway server computer 111. For example, an RM application may be needed to access an RM system, a search application may be needed to search a content repository, etc. Depending upon the role or job function of a user, one or more of these applications may be loaded into the managed container(s) on the device(s) associated with the user.

In this way, an application gateway server computer can inject new applications directly into a managed container running on a client device and remotely manage (e.g., replace, update, change, repair, remove, etc.) any of the injected applications without going through any intermediary entity such as an online app store, website, or application developer. To this end, system 100 can advantageously provide a development and integration platform for the rapid creation, administration, and distribution of applications that can be deployed and centrally managed on a variety of mobile, desktop, and web platforms. From the perspective of entities, system 100 can provide a common point of authentication where one set of credentials can provide access to various backend systems. Furthermore, system 100 can provide a secure and managed enterprise information delivery channel for client mobile and desktop platforms. From the perspective of developers, system 100 can provide a standards-based integration platform with a "write-once, run-anywhere" application development environment. Further, as explained below, system 100 can be deployed on-premises or in a cloud.

Figure 2:
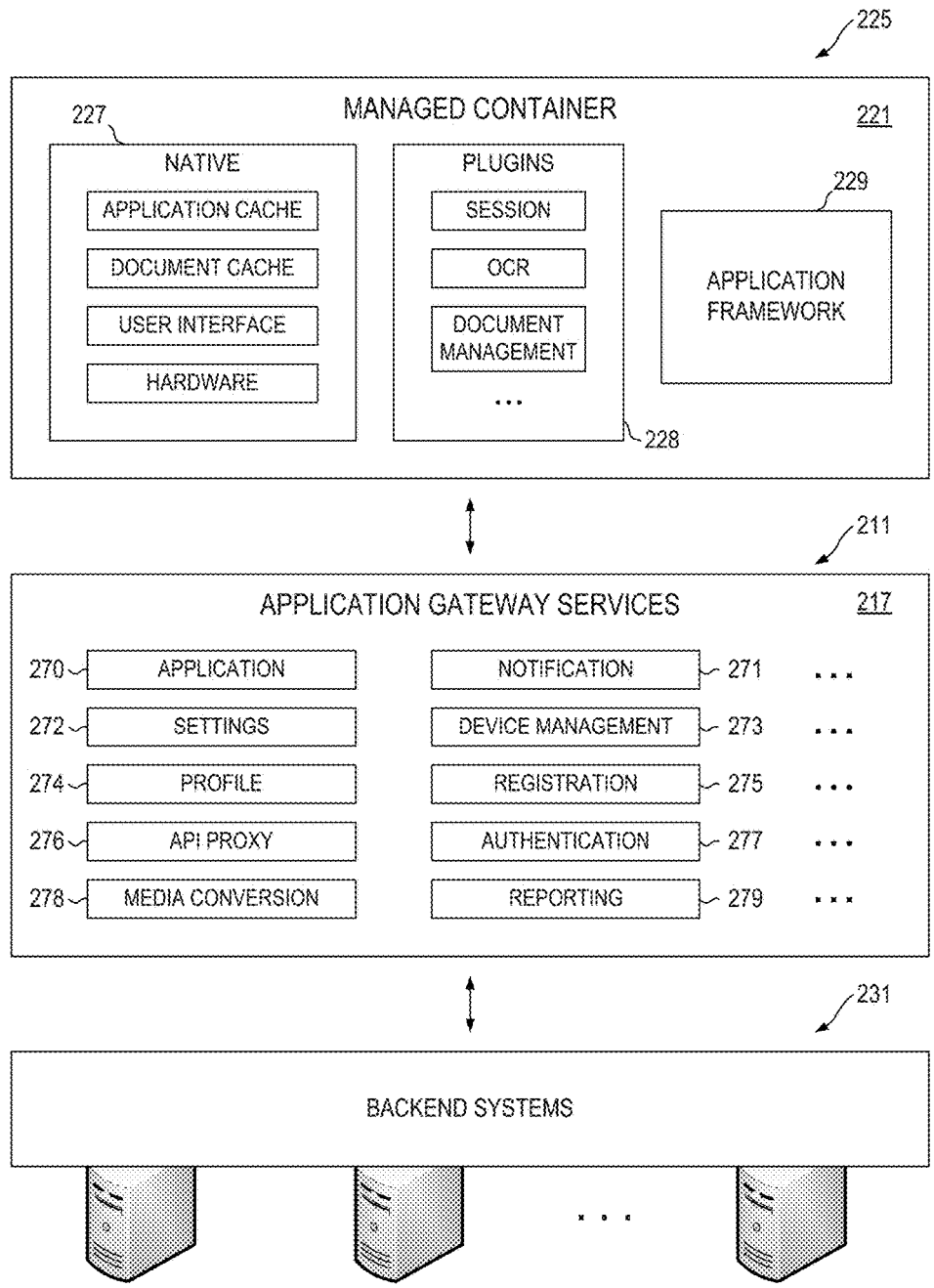
FIG. 2 depicts a diagrammatic representation of an example embodiment of a system implementing one embodiment of application gateway architecture.

Referring to FIG. 2, which depicts an example embodiment of a system implementing one embodiment of application gateway architecture described above. In the example of FIG. 2, services 217 provided by application gateway server computer 211 may include services that are necessary for building new applications (also referred to as "core services") and computer program product services for application developers to integrate existing products (also referred to as "product services"). In this disclosure, these and other services provided by application gateway server computer 211 are collectively referred to as "services." Examples of services 217 are provided below. Each of services 217 may have a corresponding API such that they can appropriately communicate with backend systems 231 and client devices 225 connected to application gateway server computer 211. As a specific example, JavaScript Object Notation (JSON) RESTful APIs may be used to communicate with backend systems 231. In some embodiments, HyperText Transfer Protocol (HTTP) APIs may be used. Additionally, application gateway server computer 211 may receive notifications from backend systems 231 and provide web services to backend systems 231. As described below, application gateway server computer 211 may send notifications to managed containers (e.g., managed container 221) running on client devices 225.

In some embodiments, managed container 221 may be implemented as a special computer program with native managed container components 227 and managed container plugins 228 written in a programming language native to client device 225. Additionally, managed container 221 may include application framework 229 for running native components 227 and managed container plugins 228. As those skilled in the art will appreciate, application framework 229 may include an execution engine that provides a runtime environment and a set of class libraries that can be accessed at runtime. Application framework 229 may be implemented to suppose various types of client devices 225, including mobile devices, desktop computers, etc.

Managed container plugins 228 may be configured to extend the capabilities of managed container 221 to provide additional features to installed client applications. Specifically, managed container plugins 228 may include a variety of features and/or functions that leverage services 217 provided by application gateway server computer 211. Non-limiting examples of managed container plugins 228 may include a session management plugin, an optical character recognition plugin, a document management plugin, etc. To support these capabilities, native managed container components 227 may include an application cache for storing applications retrieved or received from application gateway server computer 211, a document cache for storing data associated with the applications, a user interface for providing particular user experience with managed container 221, and a hardware interface for interfacing with the hardware components of client device 225.

In some embodiments, services (e.g., services 217) provided by an application gateway server computer (e.g., application gateway server computer 211) may include one or more of the following:

an application service (e.g., application service 270) for communicating with managed containers operating on client devices and installing and managing applications on the client devices, the managing including updating, disabling, or deleting one or more of the applications;

a notification service (e.g., notification service 271) for selectively sending messages to one or more managed containers on one or more client devices, to a specific application or applications contained in the one or more of the managed containers, to one or more of the backend systems, or a combination thereof;

a settings service (e.g., settings service 272) for providing a storage mechanism for settings comprising application defaults, user preferences, and application state information such that the settings are persisted at the application gateway server computer and consistent across the client devices;

a device management service (e.g., device management service 273) for communicating with the managed containers to enforce the set of rules independently of the application received from the application gateway server computer;

a user identity or profile service (e.g., profile service 274) for providing a common user identity (common authentication) across the backend systems connected to the application gateway server computer;

an enrollment service (e.g., registration service 275) for identifying a client device and registering the client device (for the purposes of tracking) with the application gateway server computer;

a proxy service (e.g., API proxy service 276) for communicating with one or more of the backend systems not explicitly supporting the application gateway architecture disclosed herein, or with external systems operating in another domain;

an authentication service (e.g., authentication service 277) for providing the managed container with a common authentication mechanism to the backend systems such that, once authenticated by the authentication service at the application gateway server computer, the managed container has access to the backend systems through the common authentication mechanism;

a media conversion service (e.g., media conversion service 278) for controlling content quality, size, format, watermarking, or a combination thereof such that the content is consumable by the client devices; and a reporting service (e.g., reporting service 279) for aggregating data across backend systems and generating reports regarding same that can be viewed by an administrator or an end user.

Figure 6:
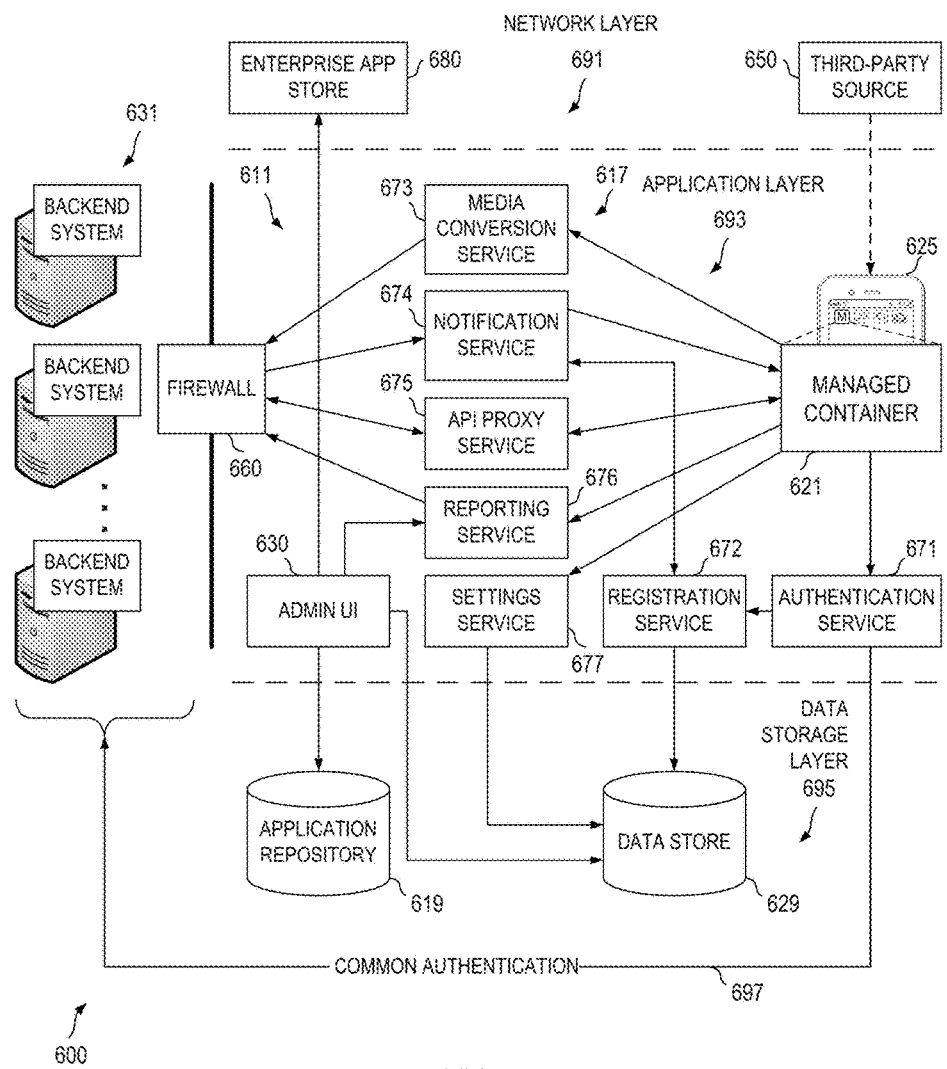
FIG. 6 depicts a diagrammatic representation of an example of an application gateway architecture in operation according to some embodiments.

Additional details of these services are provided below with reference to FIG. 6.

Figure 3:
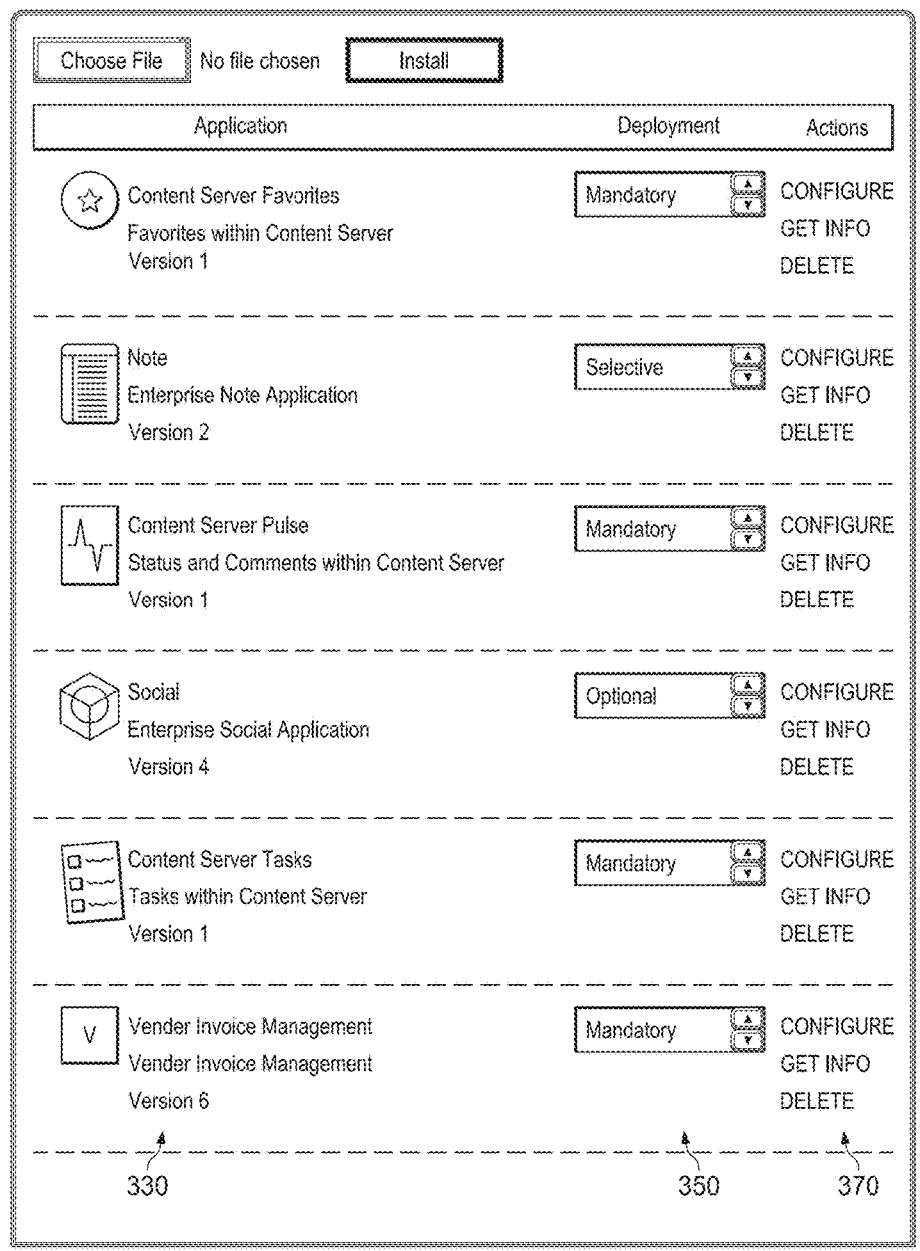
FIG. 3 depicts a diagrammatic representation of an example embodiment of an application administration interface of an application gateway server computer.

In some embodiments, an application gateway server computer may further include an application administration interface (also referred to as "admin UI") configured for administration, deployment, and configuration of applications. A diagrammatic representation of an example embodiment of an application administration interface is depicted in FIG. 3. As illustrated in FIG. 3, through application administration interface 300, an administrator may, for instance, select an application from various applications 330, select an appropriate deployment option from a plurality of deployment options 350, and/or perform one or more associated actions 370. For example, an administrator may designate an application to be deployed to a selected group of users such as employees in a human resources department or may designate the application as mandatory for everyone in an organization. Additionally, the administrator may configure an application, obtain information on an application, delete an application, edit an application, or take other appropriate action via actions 370 (e.g., change or set permissions for one or more applications 330). In this way, application administration interface 300 may provide a centralized administration and configuration for applications 330.

In some embodiments, users may be allowed to download certain applications into managed containers. Through the application administration interface, an administrator can control which user-downloaded applications can remain in the managed container, which should be updated, and/or which should be removed. Thus, an administrator can let a particular user go directly to an app store and attempt to download certain applications. However, through the application gateway server computer operating in concert with the appropriate managed container(s) running on device(s) associated with the particular user, the administrator can still control which applications can actually be downloaded by the particular user.

Figure 4:
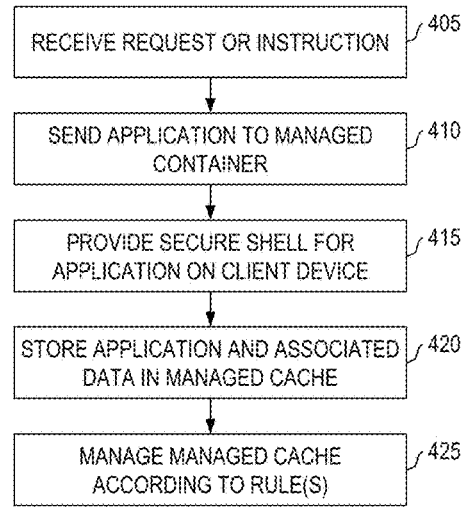
FIG. 4 is a flow chart illustrating an example of a method of operation according to some embodiments.
Figure 5:
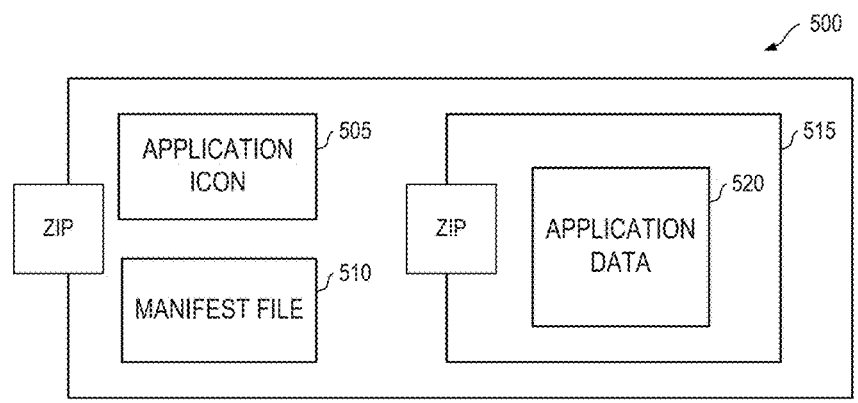
FIG. 5 depicts a diagrammatic representation of an example embodiment of an application according to some embodiments.

An example of a method of operation according to some embodiments will now be described with reference to FIG. 4. In the example of FIG. 4, method 400 may comprise receiving, by an application gateway server computer, a request for an application from a managed container running on a client device or an instruction from an administrator using an application administration interface of the application gateway server computer to send (or "load") an application to a managed container running on a client device (405). In response, the application gateway server computer may, for instance, obtain the application from a storage repository (e.g., application repository 119 shown in FIG. 1) and send the application to the managed container running on the client device (410). FIG. 5 shows an example of an application suitable for embodiments disclosed herein.

As shown in FIG. 5, an application sent from an application gateway server computer to a managed container may be realized via application package or file 500. In some embodiments, file 500 may be a compressed file (e.g., a zip file) and may contain application icon 505, manifest file 510, and application data 520. Application data 520 may also be compressed into file 515 to reduce file size for fast network transmission. Application icon 505 may comprise an image file containing an icon representing the particular application. Application data 520 may contain a configuration file and/or one or more code files associated with the particular application. The configuration file may include a short description of the particular application and one or more universal resource locator (URL) links to server side resources. At least one of the one or more code files may be configured for communicating with an operating system running on the client device. Specifically, in some embodiments, application data 520 may comprise user interface components of the particular application. However, other components of the particular application may not be included. In some embodiments, when the particular application is called (i.e., invoked by a user selecting application icon 505 from within a managed container running on a client device), the managed container may obtain, via its secure shell, any data, document(s), and/or file(s) that the particular application may need from a backend system through an application gateway server computer.

In some embodiments, an application may be coded or written in a markup language used for structuring and presenting content for the World Wide Web on the Internet. As a non-limiting example, the markup language may conform to the fifth revision of the HyperText Markup Language (HTML 5) standard. Those skilled in the art will appreciate that embodiments are not limited to HTML 5 content and can include any HTML, XML, text, etc. content as well. In embodiments where an application is written in HTML/HTML 5, application data 520 may comprise associated HTML/HTML 5 application files.

Manifest file 510 may be a metadata file containing metadata about the particular application. One example of a manifest file is provided below:

```
{
"name": "pulse",
"displayName": "Content Server Pulse",
"description": "Status and Comments ",
"status": 1, "version": "8",
"proxy_url": "https://intranet.company.com/cs/cs.dll",
"local": true
}
```

Embodiments of client devices disclosed herein may operate on various platforms, including desktop, mobile, and web. In some embodiments, applications and components for desktop platforms are written in native binaries or HTML/HTML 5. In some embodiments, applications and components for mobile and web platforms are written in HTML/HTML 5. Accordingly, an application package such as file 500 may be implemented in various ways. For example, in some embodiments, an application package may include an icon, a metadata file, a configuration file, and at least one of a compressed file for a web platform, a compressed file for a mobile platform, or a compressed file for a desktop platform.

Referring to FIG. 4, the managed container running on the client device may provide a secure shell (SSH) for the application retrieve/received from the application gateway server computer (415). As those skilled in the art will appreciate, SSH refers to a cryptographic network protocol for secure data communication. SSH supports remote command execution, command-line login, and other secure network services. SSH enables the managed container to connect to the application gateway server computer via a secure channel over an insecure network. Once received, the managed container may extract the application (e.g., from file 500 shown in FIG. 5) and store the application and associated application data in its managed cache (420). As described above with reference to FIG. 5, at this point, the application stored in the managed cache of the managed container may comprise an icon, a manifest file, and some application data, sufficient for displaying the application within a user interface of the managed container, indicating to a user of the client device that the application is ready for use. In embodiments disclosed herein, the managed container controls the managed cache in accordance with a set of rules propagated from at least one of the backend systems to the managed container via the application gateway server computer (425). As discussed above, the set of rules or a portion thereof may reside on the client device, at the application gateway server computer, at the backend, or a combination thereof. In this way, when in use, access to the application can be controlled according to applicable rule(s) and, even when the application is not in use, the application and data stored in the managed cache can be protected by the managed container according to applicable rule(s).

Thus, embodiments of a managed container can be downloaded and installed on a client device and provides a secure runtime shell within which managed applications can be run on the client device. Specifically, the managed container can proactively retrieve or passively receive an application (in the form of an application package, as explained below) from an application gateway server computer, extract the application locally and store the application and any data associated therewith (e.g., documents, etc.) locally in a managed cache that can be remotely managed/controlled by the application gateway server computer. Since content (which, in this example, includes the application and associated data) stored in the managed cache is encrypted/protected, the operating system running on the client device cannot open or view the managed content. In some embodiments, certain rules may be stored by the managed container on the client device, allowing the managed container to enforce the rules as needed whether the client device is online (connected to the application gateway server computer) or offline (disconnected from the application gateway server computer). One example rule may be to restrict access to certain content stored in the managed cache if the managed container is unable to communicate with the application gateway server computer.

As noted above, a user may still download and install applications on their devices as usual, allowing an application to connect with a backend system directly and bypassing embodiments of an application gateway server computer disclosed herein. However, such a client-server relationship (between an application installed on a user device and a backend system running on a server machine) has many drawbacks. For example, since such an application is not under the control of a managed container, the backend system may not retain control over the application, particularly when the user device may be offline. Furthermore, since data associated with the application is not stored in a managed cache, it is not protected by the managed container and thus may be vulnerable to unauthorized access by other applications and/or the operating system running on the user device. What is more, because the application communicates with the backend system directly and not through an application gateway server computer, it may not enjoy the many services provided by the application gateway server computer, including the authentication service. Accordingly, for each application that is not handled through the application gateway server computer, the user would need to authenticate with various backend systems separately.

An example of an application gateway architecture in operation will now be described with reference to FIG. 6. In this example, application gateway architecture 600 may include application gateway server computer 611 communicatively connected to a plurality of backend systems 631 through firewall 660 and a plurality of client devices 625. Additionally, application gateway server computer 611 may be communicatively connected to various storage devices at data storage layer 695, including application repository 619 and data store 629.

As described above, in some embodiments, a managed container may be implemented as an application (program) that is native to a client device, that can be downloaded from a source such as a website or an app store, and that can run on a client device separate and independent of any applications that it manages. In the example of FIG. 6, a user can download managed container 621 from various sources such as third-party source 650 (e.g., an online store on a public network such as the Internet) or enterprise app store 680 (e.g., a proprietary store on a private network such as a company's intranet) at network layer 691. Once installed, an icon associated with managed container 621 is displayed on client device 625, as shown in FIG. 6. Additional details of an example of a managed container are provided below with reference to FIG. 7.

As described above, managed container 621 can extend the capabilities of client device 625 by leveraging services 617 provided by application gateway server computer 611 at application layer 693. In some embodiments, web application archive (WAR) files may be used to package/install services 617 on application gateway server computer 611. Services 617 may vary from implementation to implementation, depending upon availability of backend systems 631. Non-limiting examples of services 617 provided by application gateway server computer 611 may include authentication service 671 for providing managed container 621 with common authentication mechanism 697 across backend systems 631 and requests for services 617 provided by application gateway server computer 611. Note that services 617 provided by application gateway server computer 611 are "reusable" and "common" to applications managed by managed container 621 in that services 617 can be leveraged by any of such applications. Once a user of client device 625 is authenticated by authentication service 671 (e.g., for an application running in managed container 621), managed container 621 has access to backend systems 631 and there is no need for the user to authenticate for other applications on client device 625 to access backend systems 631.

To authenticate, managed container 621 operating on client device 625 may first identify and authenticate itself in a connection request sent to application gateway server computer 611. In response, application gateway server computer 11 (via notification service 674) may send out a notification to managed container 621 using a notification listener or a push notification channel already established on client device 625. Push notifications and acknowledgement mechanisms are known to those skilled in the art and thus are not further described herein. Managed container 621 must be able to receive the notification from notification service 674 and respond accordingly. To be able to do so, managed container 621 must be registered with application gateway server computer 611.

In some embodiments, registration or enrollment service 672 may be provided for registering and identifying (for the purposes of tracking) a client device. Specifically, service 672 may provide common registration services to track connected client devices, track and manage client devices to enable remote wipe, block authentication for lost devices, notify a backend system on connection of a new client or device, provide a broadcast point for notification services 674, etc.

Accordingly, application gateway server computer 611 may enroll various managed containers using registration service 672 and place a certificate on an enrolled managed container. A registered/enrolled client device must report all fields required by an administrator (e.g., location, jailbreak status, device ID, etc.), implement a notification listener to receive messages from notification service 674, respond to notification messages with an acknowledgement when required (e.g., delete, remote wipe, hold, permission changes, etc.), and display and run all applications deployed from application gateway server computer 611. Jailbreak refers to removing limitations on certain highly controlled devices, such as the iPhone, manufactured by Apple Computer, Inc. of Cupertino, Calif., so that root access can be gained to allow download of additional applications, extensions, and themes not officially available on the devices. Registration or enrollment service 672 may be integrated with reporting service 676 or it may be implemented separately. This certificate or token, which is issued by application gateway server computer 611, is in addition to the certificate(s) or token(s) issued by backend system(s) 631 such as a content server that a managed container is attempting to connect. To authenticate, therefore, managed container 621 would need to provide two certificates, tokens, or the like in order to connect through application gateway server computer 611 to backend system 631.

In some embodiments, a device management service may be implemented in conjunction with registration service 672. The device management service may communicate with managed container 621 to enforce a set of rules independently of any application received from application gateway server computer 611. Specifically, the device management service may communicate with client device 621 to ensure that it is registered with application gateway server computer 611 and that it obeys the rules. The device management service allows specific instructions such as a remote wipe command to be sent to a specific client device (e.g., using the media access control address or MAC address of the client device). The device management service may perform acknowledgement verification (e.g., via an acknowledgement channel) to determine if instructions were indeed received and/or performed by a client device.

Registration data (including the identification and credentials) associated with each registered managed container may be stored in data store 629. Data store 629 may comprise a central database storing configuration data used by application gateway server computer 611. Data store 629 may be managed using admin UI 630. Admin UI 630 may implement an embodiment of application administration interface 300 described above with reference to FIG. 3. Data store 629 may further provide storage for services 617, including a server side persistent storage (e.g., a settings repository) for settings received via settings service 677. The settings repository may store and maintain client configuration and state data, provide an extensible state framework for application developers, and enable application state to be persisted across devices and clients.

To respond to the notification and to authenticate with application gateway server computer 611, managed container 621 must send an acknowledgement or an acknowledgement with additional information (e.g., metadata that match the registration data associated with managed container 621 stored in data store 629). If managed container 621 does not acknowledge the notification, then application gateway server computer 611 will not allow managed container 621 to connect to backend system 631 using their API.

As those skilled in the art will appreciate, the above example is one of many types of notifications that may be provided by notification service 674. Indeed, using notification service 674, messages may be selectively sent from application gateway server computer 11 to appropriate managed containers operating on various client devices, to a specific application or applications contained in the managed container(s), to a particular backend system or systems, or a combination thereof. For example, notification service 674 can be used to let a managed container know that a certain application is not allowed on a particular client device and needs to be deleted from the managed container. As another example, notification service 674 can be used to send a message to a managed container indicating that files older than ten days are to be deleted but does not specify which files are older than ten days. The managed container, in response to the message, can determine which files under its management are older than ten days and delete them from its managed cache.

Once managed container 621 is authenticated, on the one hand, application gateway server computer 611 can notify the now authenticated managed container 621 about what applications should reside on the client device, what new applications are available for download, etc., in addition to managing connections to backend systems 631. On the other hand, managed container 621 can download an application (e.g., in the form of an application package or file as described above with reference to FIG. 5) from application repository 619, extract the content (the application and associated data) into a local file system on its managed cache, encrypt the extracted content, store the encrypted content in the secure managed cache, and drop an icon so that a reference to the application shows up in a user interface of managed container 625. As explained above with reference to FIG. 3, the deployment of an application may be made mandatory, selective, or optional by an administrator. Since the application is downloaded from application repository 619 into the managed cache, an update to the application published from application repository 619 can be downloaded to managed container 621 when the update is installed (e.g., by an administrator). Furthermore, the application can be removed from the managed cache when it is deleted or otherwise removed from application repository 619.

When the icon for the application is selected or otherwise invoked from within managed container 621, the application opens up an user interface on client device 625 and makes an API call (e.g., a JSON API call) to application gateway server computer 611 (using an appropriate certificate or token issued by application gateway server computer 611) to access backend system 631 (with an appropriate certificate or token issued by backend system 631). In some cases, API calls may be handled by API proxy service 675. In some embodiments, API proxy service 675 can be configured for communicating with (e.g., making JSON and/or HTTP API calls to) any backend system that does not explicitly support application gateway 611. In some embodiments, API proxy service 675 can be configured for communicating with external systems on another domain. API proxy service 675 may maintain a list of allowed and/or disallowed third party services (e.g., in data store 629).

In some embodiments, settings service 677 may be configured for providing a storage mechanism for settings comprising application defaults, user preferences (e.g., favorite documents, color scheme, etc.), and application state information such that these settings can be persisted (e.g., in data store 629) at the server side and consistent across the client devices and/or managed applications.

In some embodiments, content (e.g., documents, video files, etc.) from backend systems 631 may be processed at application gateway server computer 611, for instance, using media conversion service 673. In some embodiments, media conversion service 673 may be configured for controlling content quality, size, format, watermarking, or a combination thereof such that the content is consumable by particular client devices and/or per specific user preferences stored in data store 629. In some embodiments, media conversion service 673 may convert various types of content. For example, media conversion service 673 may convert a word processing document to a portable document format (PDF) to prevent changes and also watermark the PDF document. As another example, media conversion service 673 may be configured to produce only low resolution images, etc.

Note that, even if a user can open an application from within a managed container, they cannot do anything unless they have the appropriate certificate or token issued by the application gateway server computer. All the API calls that come in from client devices for connections through the application gateway server computer to the backend systems are handled by the application gateway server computer.

In an offline/disconnected scenario, the application may be opened and used (assuming such use(s) is/are allowed according to admin rules propagated from the application gateway server computer). There would still be an authentication check, but it would be based on the last set of cached credentials from the last valid authentication/connection with the application gateway server computer, due to the disconnected nature.

Figure 7:
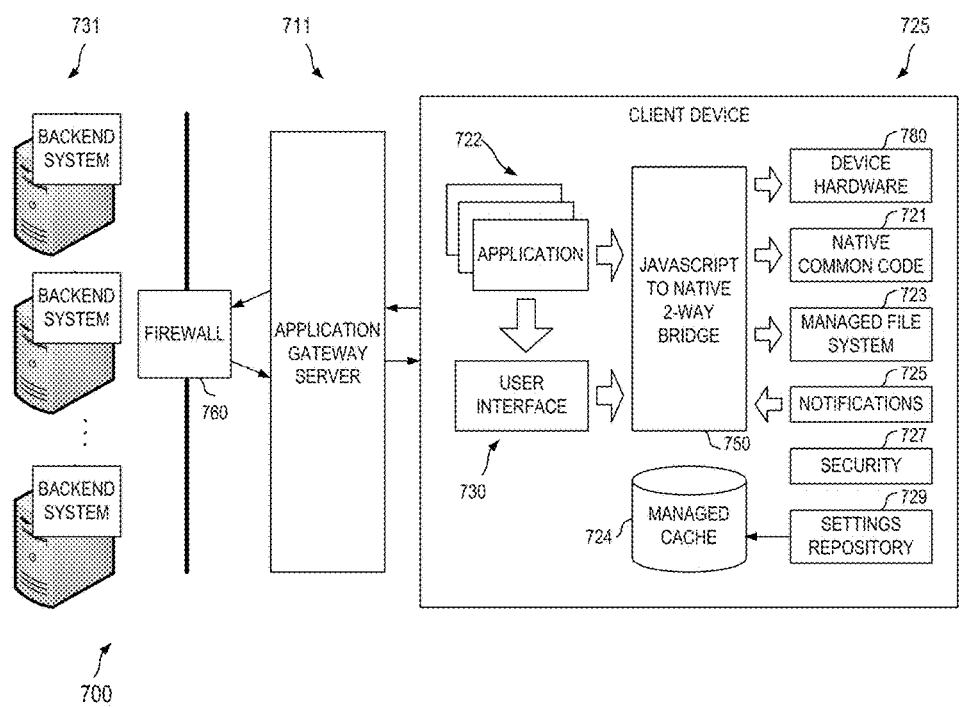
FIG. 7 depicts a diagrammatic representation of an example of a managed container operating on a type of client device according to some embodiments.
Figure 8:
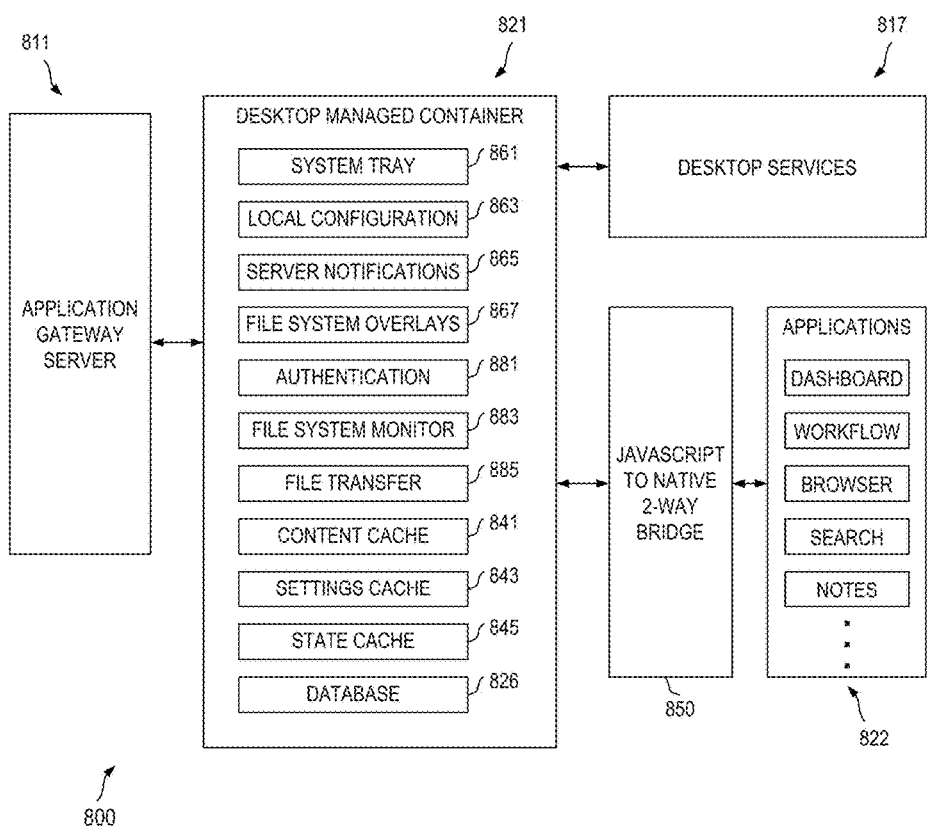
FIG. 8 depicts a diagrammatic representation of an example of a managed container operating on another type of client device according to some embodiments.

As described above, client devices may operate on various platforms, including desktop, mobile, and web. FIGS. 7 and 8 depict diagrammatic representations of managed containers operating on different types of client device according to some embodiments.

Specifically, FIG. 7 depicts application gateway architecture 700 including application gateway server computer 711 communicatively connected to a plurality of backend systems 731 through firewall 760 and a plurality of client devices 725. Application gateway server computer 711 may implement an embodiment of an application gateway server computer described above. Client device 725 may implement an embodiment of a managed container described above.

As shown in FIG. 7, client device may include JavaScript to Native 2-Way Bridge 750 ("bridge 750) and device hardware 780. Device hardware 780 may include various hardware components commonly found on a mobile device such as a smart phone or a handheld or portable computing device. Bridge 750 may provide a common JavaScript API for interfacing the JavaScript side (e.g., applications 722, services provided by application gateway server computer 711, etc.) with the native (common) code in which a managed container is implemented ("managed container 721"). Bridge 750 may also interface with native device capabilities, including camera, native viewer, e-mail, contacts, GPS, etc. As explained above, applications 722 may be retrieved and/or received from application gateway server computer 711 and may not be available from commercial app stores on the Internet.

Acting as a native shell for applications 722 downloaded to client device 725, managed container 721 has knowledge (e.g., via managed file system 723) of where contents (applications 722 and data associated therewith) are stored in managed cache 724, can display a download progress bar on client device 725 via managed container user interface 730 (which includes common UI components in the native code), and can receive notifications 725 in the background and take appropriate action accordingly. For example, if an administrator wishes to restrict access to application 722 downloaded onto client device 725, notification 725 to remove application 722 can be sent to managed container 725, as described above, and managed container 721 will respond to notification 725 and delete application 722 from managed cache 724. All related metadata and applicable cached content will be deleted as well. Correspondingly, the icon for application 722 will disappear from user interface 730 of the managed container.

In some embodiments, user interface 730 may include reusable UI components that can be leveraged by any installed applications 722. Presentation of these reusable UI components determined by managed container 721 may provide native or intuitive user experiences. Non-limiting examples of reusable UI components for user interface 730 may include a browse list with a paging capability, form input controls, a server browse function, a user profiles and lookup function, a document viewer, etc.

As described above, managed cache 724 may include an application cache and a document cache. The document cache is not limited to storing documents and may also contain other file types such as videos, photos, and so on. The application cache can be used by managed container 721 to manage applications on the client device and communicate with the application gateway server computer to access and/or update applications 722. The application cache may be configured with security 727 such that if managed container 721 is unable to communicate with the application gateway server computer, certain applications 722 stored in the application cache cannot be accessed. Another way to control access to applications 722 stored in the application cache may be done via device hardware 780. For example, managed container 721 may be configured to communicate with device hardware 780 to determine whether client device 725 has been "jail-broken" and, if so, operate to restrict access to certain applications and/or documents stored in managed cache 724.

The document cache can be used by managed container 721 to manage documents in a hierarchical manner (via managed file system 723) and control access to selected documents stored in the document cache. For example, when a user desires to open a document, an application associated with the document may call managed container 721. Managed container 721 may operate to determine, via security 727, whether the user has the proper permission to open the document and check to see if there is a version of the document already in managed cache 724. If so, managed container 721 may give that document to the application and make no calls to application gateway server computer 711. In some embodiments, managed container 721 may call application gateway server computer 711 with the appropriate certificates or tokens to connect through application gateway server computer 711 to backend system 731 to get an updated version of the document.

FIG. 8 depicts a diagrammatic representation of an example of a managed container operating on another type of client device according to some embodiments. Specifically, FIG. 8 depicts application gateway architecture 800 including application gateway server computer 811 communicatively connected to a plurality of backend systems (e.g., via a firewall such as firewall 760 shown in FIG. 7) and a plurality of desktop client devices. Examples of desktop client devices may include work stations, desktop computers, etc. Application gateway server computer 811 may implement an embodiment of an application gateway server computer described above and provide desktop services 817 to desktop clients connected thereto. Desktop services 817 may include core services and/or computer program product services similar to those described above with reference to services 117, services 217, and services 617. Desktop managed container 721 may implement an embodiment of a managed container described above.

In some embodiments, each desktop client device may include library 850 that may act as an interface or bridge from the JavaScript side (applications 822) into the native (common) code in which a desktop managed container is implemented ("desktop managed container 821"). As explained above, applications 822 may be retrieved and/or received from application gateway server computer 811 and may not be available from commercial app stores on the Internet.

In some embodiments, desktop managed container 821 may be required for a desktop client application of a backend system running in an enterprise computing environment. Accordingly, when the desktop client application installs, it may detect whether desktop managed container 821 exists. If it does, desktop managed container 821 may be used to update and install services and components that can be used by the new desktop client application. If it does not, desktop managed container 821 may be installed first and then used to install services and components that can be used by the new desktop client application. In some embodiments, desktop client applications running in an enterprise computing environment may re-use services and components from desktop managed container 821 (e.g., via JavaScript to Native bridge 850) and wrap/create their own experiences.

In some embodiments, desktop managed container 821 may be configured to provide a plurality of features and/or functions, including configuration push, component and service updates, application distribution and configuration, cache management and policy enforcement, state synchronization with other platforms, etc. In this way, desktop managed container 821 can provide a common integration point and a common user experience focal point in the desktop computing environment. Non-limiting example features and/or functions of desktop managed container 821 may include system tray 861, local configuration 863, server notifications 865, file system overlays 867, authentication 881, file system monitor 883, file transfer 885, content cache 841, settings cache 843, state cache 845, and database 826.

System tray 861 may include a common tray icon for desktop managed container 821 that is used across all desktop client devices. System tray 861 may further include a common menu where authorized users and/or applications (including desktop client applications associated with backend systems) can place specific menu entries. Furthermore, system tray 861 may include a launch point for all the installed applications.

Local configuration 863 may include local configuration settings for desktop managed container 821 and associated users. Authorized users can extend and add additional configuration settings as needed.

Server notifications 865 may be configured to route notifications from a push notification service to appropriate application(s) (whether managed by desktop managed container 821 or not). Additionally, server notifications 865 may be configured to display the notifications.

File system overlays 867 may be configured to provide common file system services for adding icon badges to file system objects managed by desktop managed container 821.

Authentication 881 may include a single set of credentials and an URL for each desktop client device operating in the enterprise computing environment. Desktop managed container 821 may look up the URL based on a site name registered with application gateway server computer 811. Application gateway server computer 811 may register a desktop client device via a registration service similar to registration service 672 described above with reference to FIG. 6.

File system monitor 883 may include a registered driver for applications managed via desktop managed container 821. Specifically, an API may register as a watcher and may register file system locations to watch.

File transfer 885 may be configured to perform file upload/download that supports HTTP range headers. Additionally, file transfer 885 may be configured to allow for resuming transfers via application gateway server computer 811.

Content cache 841, settings cache 843, and state cache 845 may collectively be referred to as a managed cache. Similar to database 126 described above with reference to FIG. 1, database 826 may be used by desktop managed container 821 to keep track of content stored in the managed cache. Additionally, similar to embodiments of a managed cached described above, content cache 841 may be configured for storing content (including desktop client applications associated with backend systems), allowing the backend systems to retain control of downloaded content and enforce applicable rules in an effective and efficient manner. To this end, settings cache 843 may store application settings and configuration and state cache 845 may provide a client side API to allow the applications to save their state and sync with application gateway server computer 811. This allows application gateway server computer 811 to replicate the state across platforms and devices. For example, a user works on a document using a first version of an application managed by a first managed container on a first device. The state of the first version of the application is saved and sync with an application gateway server computer. The user may wish to work on the document using a second version of the application managed by a second managed container on a second device. The application gateway server computer may communicate the state information to the second managed container. When the second version of the application is opened, the second managed container may replicate the state of the application and the user can work on the document where it was left off, using the second version of the application managed by the second managed container on the second device.

Embodiments disclosed here in can be implemented in various ways. For example, in some embodiments, components of an application gateway architecture described above can be deployed on premises, on premises as a virtual machine, or in a cloud computing environment (including entirely or partially hosted in the cloud). Other implementations may also be possible.

Figure 9:
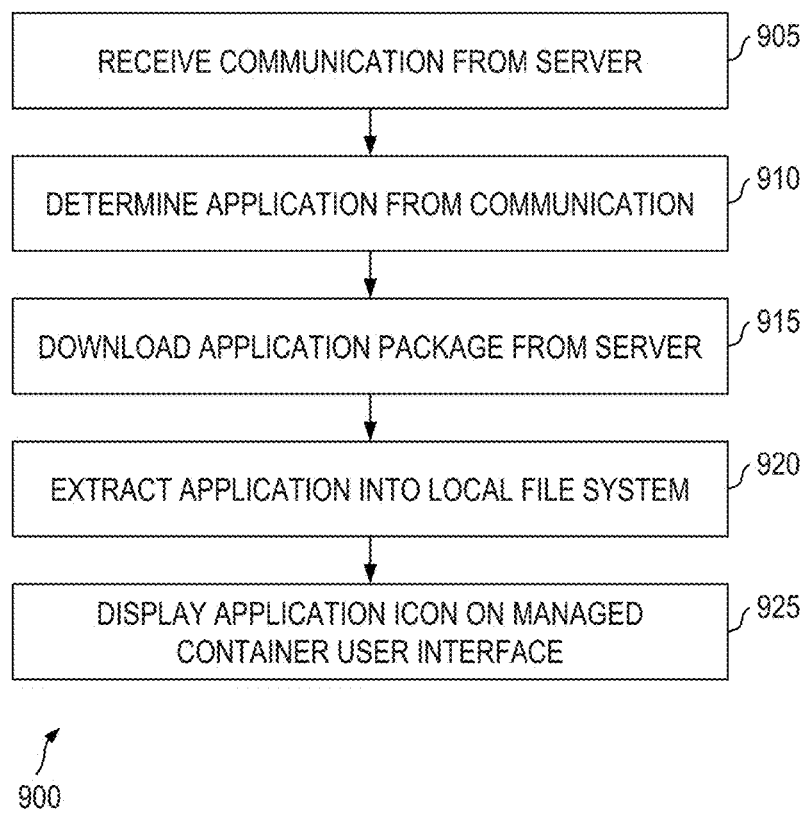
FIG. 9 is a flow chart illustrating an example of a method of operation according to some embodiments.

For example, embodiments of managed containers described above may be implemented to work with an application gateway server computer and may be deployed in an enterprise computing environment where the application gateway server computer operates. However, in addition to such an application gateway server computer, in some embodiments, managed containers may be implemented to work with other types of servers. These servers may operate in different computing environments across disparate platforms. Nevertheless, managed containers may provide a secure way to extend the control of a server over downloaded content—including applications—residing on user devices. That is, using an embodiment of a managed container disclosed herein, a server can manage and/or control an application downloaded from the server to a user device where the managed container operates. To this end, an example of a method of operation from the perspective of a managed container according to some embodiments is illustrated in FIG. 9.

Specifically, in some embodiments, a managed container (also referred to herein as "management component") operating on a client device may receive a communication (e.g., a message, a notification, etc.) from a server computer over a network (e.g., the Internet, an intranet, a wireless network, a wired network, a local area network, a wide area network, a cellular network, etc.) (905). In some embodiments, the communication from the server computer may include a list of applications managed by the server computer. In some embodiments, the list may be prepared by the server computer when an application (e.g., an enterprise application), a file associated therewith (e.g., enterprise information), or a rule (e.g., an enterprise rule) is to be deployed to the client device. In some embodiments, the communication may contain a reference to a particular application. In some embodiments, such deployment may be due to a policy change or an update to the application. As a specific example, an enterprise application may be associated with an enterprise system at the backend and a change to the enterprise system at the backend may trigger an update to enterprise application and/or the enterprise information. In some embodiments, the communication may be sent by the server computer in response to a request from the managed container operating on the client device or pushed out to the managed container per an instruction received by the server computer or per a predetermined schedule.

In some embodiments, the managed container may keep track (e.g., via a small database stored in a managed cache of the managed container, as described above) of applications downloaded and stored in the managed cache. The managed container may operate to examine the communication received from the server computer, compare what is stored in the managed cache with the list or the reference, and determine what, if any, application should be downloaded (910).

Suppose the managed container determines that a particular application is to be downloaded, the managed container may retrieve an application package or file from the server computer and download it into a secure environment provided by the managed container on the client device (915). As explained above, this secure environment may be a secure shell that is not accessible by an operating system or other applications running on the client device.

The application package (which, in some embodiments, may be compressed) downloaded by the managed container from the server computer may be associated with the particular application and may, as described above, include a minimal number of application components such as an icon, a metadata file, and one or more code files (which may also be compressed).

The managed container may operate to extract the application package associated with the particular application into a local file system of the managed cache (also referred to herein as "protected storage area" or "protected cache") on the client device (920). As described above, content in the managed cache may be encrypted and thus protected from unauthorized access, for instance, by an operating system running on the client device or other applications not managed by the server computer.

The managed cache may update the local database (which may also be stored in the managed cache and local to the managed cache) and display an icon for the particular application within a user interface of the managed container on the client device (925). A user of the client device can then access the particular application from within the managed container as described above.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method, comprising:
   downloading, by a client device from a network source, a managed container;
   receiving, by the managed container on the client device over a network, a communication from a server computer operating in an enterprise computing environment, the communication from the server computer including a reference of an application or a list of applications managed by the server computer;
   examining, by the managed container on the client device, the communication from the server computer, the managed container having a user interface, a managed cache, and an application framework, the application framework of the managed container including an execution engine that provides a runtime environment for applications associated with backend systems running in the enterprise computing environment, wherein the runtime environment provided by the managed container on the client device is not accessible by applications that reside on the client device and that are not managed by the server computer, the examining including comparing the reference or the list in the communication from the server computer with any application already downloaded and stored in the managed cache of the managed container;
   determining, by the managed container on the client device based at least in part on the communication received from the server computer, whether to download any application referenced in the communication from the server computer;
   downloading, by the managed container on the client device, an application package associated with a first application from the server computer into the managed cache of the managed container on the client device, the downloading responsive to the managed container determining to download the first application referenced in the communication from the server computer, the application package associated with the first application containing an icon for the first application;
   extracting, by the managed container on the client device and within the runtime environment provided by the managed container on the client device, the application package associated with the first application, wherein the extracting further comprises extracting the application package into a local file system of the managed cache of the managed container on the client device;
   displaying, by the managed container on the client device, the icon for the first application on the user interface of the managed container on the client device, and
   providing, by the managed container, a secure runtime shell within which the first application is run when invoked via the icon for the first application displayed on the user interface of the managed container.

2. The method according to claim 1, further comprising: tracking applications that are managed by the server computer and that are downloaded and stored in the managed cache of the managed container, the tracking performed by the managed container using a database stored in the managed cache of the managed container.

3. The method according to claim 2, further comprising: updating the database stored in the managed cache of the managed container to include the first application downloaded by the managed container on the client device into the managed cache of the managed container on the client device.

4. The method according to claim 1, further comprising: sending a request for application from the managed container to the server computer, wherein the receiving the communication from the server computer occurs subsequent to the sending the request from the managed container operating on the client device to the server computer.

5. The method according to claim 1, wherein the application package comprises a minimal number of application components of the first application, the minimal number of application components including the icon for the first application, a metadata file, and a code file.

6. The method according to claim 1, wherein the runtime environment provided by the managed container on the client device is not accessible by an operating system on the client device.

7. The method according to claim 1, wherein the first application downloaded from the server computer by the managed container on the client device is a client application of a backend system running in the enterprise computing environment.

8. An apparatus, comprising:
   a processor;
   a non-transitory computer readable medium; and stored instructions translatable by the processor to perform:
  downloading a managed container from a network source and into the non-transitory computer readable medium, the managed container having a user interface, a managed cache, and an application framework, the application framework of the managed container including an execution engine that provides a runtime environment for applications associated with backend systems running in an enterprise computing environment, wherein the managed container is operable by the processor for performing:
    receiving a communication from a server computer operating in the enterprise computing environment, the communication from the server computer including a reference of an application or a list of applications managed by the server computer, wherein the runtime environment provided by the managed container on the client device is not accessible by applications that reside on the client device and that are not managed by the server computer;
    examining the communication from the server computer, the examining including comparing the reference or the list in the communication from the server computer with any application already downloaded and stored in the managed cache of the managed container;
    determining, based at least in part on the communication received from the server computer, whether to download any application referenced in the communication from the server computer;
    downloading an application package associated with a first application from the server computer into the managed cache of the managed container on the client device, the downloading responsive to the managed container determining to download the first application referenced in the communication from the server computer, the application package associated with the first application containing an icon for the first application;
    extracting, within the runtime environment provided by the managed container, the application package associated with the first application, wherein the extracting further comprises extracting the application package into a local file system of the managed cache of the managed container on the client device;
    displaying the icon for the first application on the user interface of the managed container; and
    providing a secure runtime shell within which the first application is run when invoked via the icon for the first application displayed on the user interface of the managed container.

9. The apparatus of claim 8, wherein the managed container is further operable for performing:
  tracking applications that are managed by the server computer and that are downloaded and stored in the managed cache of the managed container, the tracking performed using a database stored in the managed cache of the managed container.

10. The apparatus of claim 9, wherein the managed container is further operable for performing:
  updating the database stored in the managed cache of the managed container to include the first application downloaded by the managed container into the managed cache of the managed container.

11. The apparatus of claim 9, wherein the runtime environment provided by the managed container on the client device is not accessible by an operating system on the client device.

12. The apparatus of claim 9, wherein the first application downloaded from the server computer by the managed container on the client device is a client application of a backend system running in the enterprise computing environment.

13. The apparatus of claim 8, wherein the managed container is further operable for performing:
  sending a request for application from the managed container to the server computer, wherein the receiving the communication from the server computer occurs subsequent to the sending the request from the managed container to the server computer.

14. The apparatus of claim 8, wherein the application package comprises a minimal number of application components of the first application, the minimal number of application components including the icon for the first application, a metadata file, and a code file.

15. A computer program product comprising a non-transitory computer readable medium storing instructions of a managed container, the managed container having a user interface, a managed cache, and an application framework, the application framework of the managed container including an execution engine that provides a runtime environment for applications associated with backend systems running in an enterprise computing environment, the instructions of the managed container translatable by a processor of a client device of a server computer operating in the enterprise computing environment, the instructions of the managed container when translated by the processor of the client device perform:
  receiving a communication from the server computer operating in the enterprise computing environment, the communication from the server computer including a reference of an application or a list of applications managed by the server computer;
  examining the communication from the server computer, the examining including comparing the reference or the list in the communication from the server computer with any application already downloaded and stored in the managed cache of the managed container, wherein the runtime environment provided by the managed container on the client device is not accessible by applications that reside on the client device and that are not managed by the server computer;
  determining, based at least in part on the communication received from the server computer, whether to download any application referenced in the communication from the server computer;
  downloading an application package associated with a first application from the server computer into the managed cache of the managed container on the client device, the downloading responsive to the managed container determining to download the first application referenced in the communication from the server computer, the application package associated with the first application containing an icon for the first application;
  extracting, within the runtime environment provided by the managed container, the application package associated with the first application, wherein the extracting further comprises extracting the application package into a local file system of the managed cache of the managed container;

displaying the icon for the first application on the user interface of the managed container; and providing a secure runtime shell within which the first application is run when invoked via the icon for the first application displayed on the user interface of the managed container.

16. The computer program product of claim 15, wherein the instructions are further translatable by the processor for performing:

tracking applications that are managed by the server computer and that are downloaded and stored in the managed cache of the managed container, the tracking performed using a database stored in the managed cache of the managed container.

17. The computer program product of claim 16, wherein the instructions are further translatable by the processor for performing:

updating the database stored in the managed cache of the managed container to include the first application downloaded by the managed container into the managed cache of the managed container.

18. The computer program product of claim 15, wherein the instructions are further translatable by the processor for performing:

sending a request for application from the managed container to the server computer, wherein the receiving the communication from the server computer occurs subsequent to the sending the request from the managed container to the server computer.

19. The computer program product of claim 15, wherein the application package comprises a minimal number of application components of the first application, the minimal number of application components including the icon for the first application, a metadata file, and a code file.

20. The computer program product of claim 15, wherein the first application downloaded from the server computer by the managed container on the client device is a client application of a backend system running in the enterprise computing environment.

* * * * *